US008210563B2

(12) United States Patent
Dotsey et al.

(10) Patent No.: US 8,210,563 B2
(45) Date of Patent: Jul. 3, 2012

(54) REVERSIBLE STROLLER HANDLE

(75) Inventors: Michael A. Dotsey, Pottstown, PA (US);
Patrick W. Laffan, Bridgeport, PA (US);
Stephen Ahnert, Philadelphia, PA (US);
Devon T. Siesholtz, Boyertown, PA (US); Branden McCorkel, Mount Joy, PA (US); Robert T. Pike, Cumming, GA (US); Joseph T. Grintz, Glenmoore, PA (US)

(73) Assignee: Graco Children's Products Inc., Atlanta, GA (US)

( * ) Notice: Subject to any disclaimer, the term of this patent is extended or adjusted under 35 U.S.C. 154(b) by 306 days.

(21) Appl. No.: 12/551,296

(22) Filed: Aug. 31, 2009

(65) Prior Publication Data

US 2010/0156060 A1    Jun. 24, 2010

Related U.S. Application Data

(60) Provisional application No. 61/139,505, filed on Dec. 19, 2008, provisional application No. 61/144,993, filed on Jan. 15, 2009.

(51) Int. Cl.
*B62B 7/06* (2006.01)
(52) U.S. Cl. ............... 280/647; 280/642; 280/47.371
(58) Field of Classification Search .......... 280/639, 280/642, 647, 650, 655, 655.1, 657, 658, 280/47.34, 47.36, 47.371, 47.38
See application file for complete search history.

(56) References Cited

U.S. PATENT DOCUMENTS

| | | | | |
|---|---|---|---|---|
| 4,779,879 A | * | 10/1988 | Kassai | 280/47.36 |
| 4,832,361 A | | 5/1989 | Nakao et al. | |
| 5,056,805 A | * | 10/1991 | Wang | 280/47.36 |
| 5,257,799 A | * | 11/1993 | Cone et al. | 280/642 |
| 5,301,970 A | | 4/1994 | Haskins | |
| 5,601,302 A | | 2/1997 | Beard et al. | |
| 5,709,400 A | | 1/1998 | Bonnier et al. | |
| 5,845,924 A | | 12/1998 | Huang | |
| 6,073,945 A | * | 6/2000 | Cheng | 280/47.36 |
| 6,099,022 A | | 8/2000 | Pring | |
| 6,193,263 B1 | | 2/2001 | Lin | |
| 6,203,054 B1 | | 3/2001 | Matsumoto | |

(Continued)

FOREIGN PATENT DOCUMENTS

CN    1600617    3/2005

(Continued)

OTHER PUBLICATIONS

Britax Preview Lightweight Umbrella Travel System (Jun. 2004).

(Continued)

*Primary Examiner* — John Walters
(74) *Attorney, Agent, or Firm* — Lempia Summerfield Katz LLC

(57) ABSTRACT

A stroller includes a frame, a pivot joint assembly mounted on the frame, and a handle coupled to the frame at the pivot joint assembly. The handle rotates about a pivot axis defined by the pivot joint assembly between first and second positions relative to the frame. A latch assembly includes a projection and is movable between a latched state in which the latch assembly secures the handle in either the first position or the second position and a released state in which the handle is released for movement between the first and second positions. A latch guide defines a path along which the projection rides during the movement between the first and second positions such that the projection remains in the released state during the movement between the first and second positions

18 Claims, 24 Drawing Sheets

U.S. PATENT DOCUMENTS

| | | |
|---|---|---|
| 6,209,892 B1 | 4/2001 | Schaaf et al. |
| 6,398,233 B1 | 6/2002 | Liang et al. |
| 6,446,990 B1 | 9/2002 | Nania et al. |
| 6,540,250 B1 | 4/2003 | Peterson |
| 6,715,783 B1 | 4/2004 | Hanson et al. |
| 6,893,031 B2 * | 5/2005 | Suzuki .................. 280/47.36 |
| 7,798,500 B2 * | 9/2010 | Den Boer ............... 280/47.34 |
| 2006/0001226 A1 | 1/2006 | Refsum |
| 2007/0045975 A1 | 3/2007 | Yang |
| 2010/0102535 A1 * | 4/2010 | Zhong ..................... 280/650 |

FOREIGN PATENT DOCUMENTS

| | | |
|---|---|---|
| DE | 2 648 102 | 12/1990 |

OTHER PUBLICATIONS

Stokke Product Guide featuring Stokke Xplory stroller, 7 pages (Fall 2006).

Chinese office action issued in related Chinese application No. 200910209662.9 mailed Sep. 1, 2011 (10 pages).

\* cited by examiner

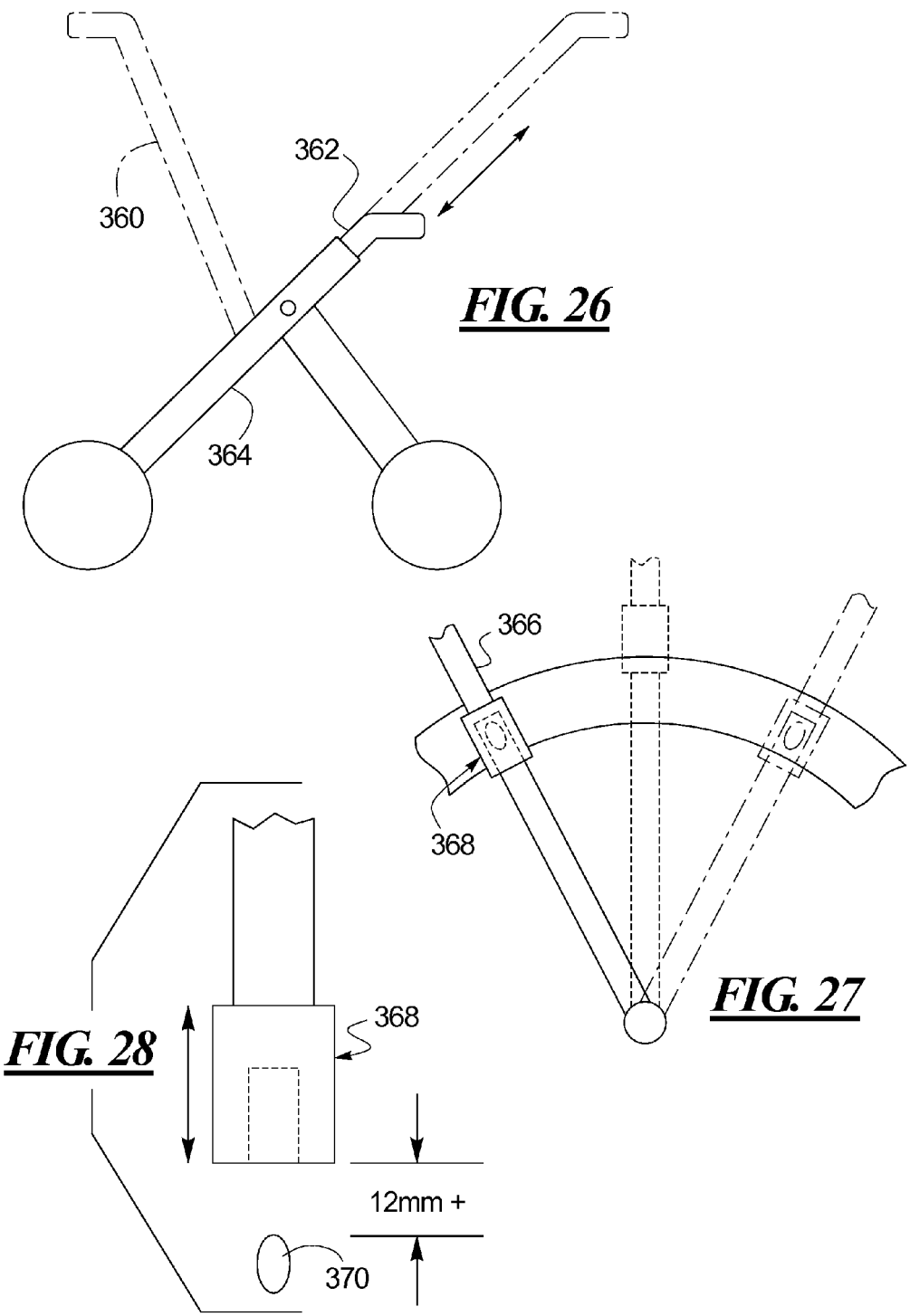

REVERSIBLE STROLLER HANDLE

CROSS-REFERENCE TO RELATED APPLICATION

This application claims the benefit of U.S. provisional application entitled "Reversible Stroller Handle," filed Dec. 19, 2008, and having Ser. No. 61/139,505, and the benefit of U.S. provisional application entitled "Reversible Stroller Handle," filed Jan. 15, 2009, and having Ser. No. 61/144,993, the entire disclosures of which are hereby expressly incorporated by reference.

BACKGROUND OF THE DISCLOSURE

1. Field of the Disclosure

The present disclosure is generally directed to strollers, and more particularly to strollers having reversible handles.

2. Description of Related Art

Strollers have been equipped with a reversible handle for pushing the stroller in different directions. With the handle in one position, the stroller can be pushed in a forward or normal direction. In this direction, the standard toddler seat typically faces forward. The handle is then reversed to a second position in which the handle is positioned in front of the toddler seat to push the stroller in a reverse direction. In the reverse position, the toddler seat faces the handle and thus the caregiver.

The handles of these strollers are often configured with a pivot point and a handle latch. The handle typically pivots or rotates about the pivot points between the normal and reverse positions. The handle latch then retains the handle in a selected position when latched, releasing the handle when unlatched.

The pivot points or latch mechanisms too often create significant pinch points where a child or a caregiver can be pinched during the repositioning of the handle. Unfortunately, these pinch points can result in high loads generated at the shear or pinch point because the typical handle hits a mechanical, exposed stop near the handle pivot points while the caregiver is still adjusting and applying a force to the handle.

The potential for pinch points is also presented during a folding operation on these and other strollers. Strollers can often be released from a set-up or in-use configuration for folding to a folded configuration for storage. To that end, the strollers typically include a fold latch on each side of the stroller. The fold latch usually retains the stroller in the set-up or in-use configuration when latched. Releasing the fold latch(es) then allows the stroller frame to fold at a number of frame pivot points, the structures of which are typically separate from the structures of the handle pivot points. Each of the separate structures also potentially creates a separate pinch point as well. Like the handle latch pinch points, the fold latch pinch points are often exposed at child-accessible levels or positions at which a significant force can be generated when a caregiver is acting on two frame or latch mechanism components to fold the stroller.

SUMMARY OF THE DISCLOSURE

In accordance with one aspect of the disclosure, a stroller includes a frame, a pivot joint assembly mounted on the frame and defining a pivot axis, a handle coupled to the frame at the pivot joint assembly. The pivot assembly is configured for rotation of the handle about the pivot axis between first and second positions relative to the frame. A latch assembly includes a projection and movable between a latched state in which the latch assembly secures the handle in either the first position or the second position and a released state in which the handle is released for movement between the first and second positions. A latch guide defines a path along which the projection rides during the movement between the first and second positions such that the projection remains in the released state during the movement between the first and second positions.

In some cases, the pivot assembly includes a housing within which the projection is disposed. In these and other cases, the latch guide may include a cam slot.

In some cases, the pivot assembly may include the latch guide.

The pivot joint assembly may include a hub, and the projection and the latch guide may be enclosed within the hub. The latch assembly may then include first and second stops enclosed within the hub to define the first and second positions, respectively.

The frame may include an armrest link. In some cases, the latch assembly includes a latch clasp that runs along and against the armrest link during the movement. Alternatively or additionally, the armrest link may include a surface that defines the latch guide.

In accordance with another aspect of the disclosure, a stroller includes a frame, a pivot joint assembly mounted on the frame and including a hub that defines a pivot axis, and a handle coupled to the frame at the pivot assembly. The pivot assembly is configured for rotation of the handle about the pivot axis between first and second positions relative to the frame. A latch assembly is movable between a latched state in which the latch assembly secures the handle in either the first position or the second position and a released state in which the handle is released for movement between the first and second positions. The latch assembly includes first and second stops enclosed within the hub to define the first and second positions, respectively.

In some cases, the hub includes a housing in which the first and second stops are disposed. Alternatively or additionally, the hub includes a cam housing and a cam cover configured to meet the cam housing. The cam housing may define a cam slot, and the latch assembly may include a projection engaged in the cam slot such that the cam slot guides the projection during the movement between the first and second positions.

BRIEF DESCRIPTION OF THE DRAWINGS

Objects, features, and advantages of the present invention will become apparent upon reading the following description in conjunction with the drawing figures, in which like reference numerals identify like elements in the figures, and in which:

FIG. 26 shows a schematic, side view of an alternative stroller having a reversible handle arrangement having one or more telescoping push bars in accordance with another aspect of the disclosure;

FIG. 27 shows a schematic, side view of another example of a reversible handle arrangement having a handle latch and a latch guide constructed in accordance with one or more aspects of the disclosure;

FIG. 28 shows a detailed, schematic view of a portion of an exemplary handle latch of the handle arrangement of FIG. 28 just prior to latching;

DETAILED DESCRIPTION OF THE DISCLOSURE

Figure 1:
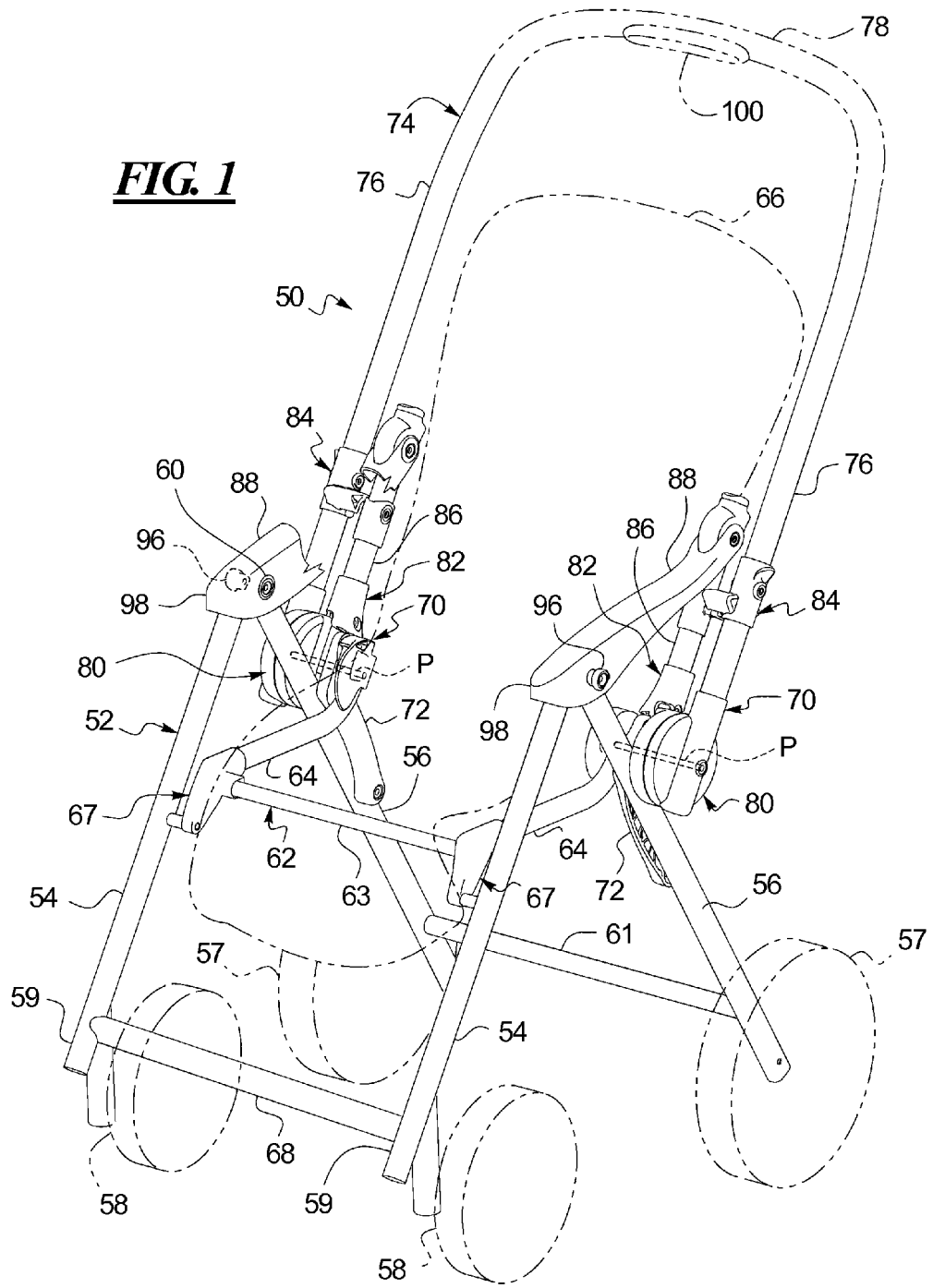
FIG. 1 shows a perspective, front view of an exemplary stroller in an in-use configuration with a handle in a normal position, the stroller having pivot and latch assemblies constructed in accordance with several aspects of the disclosure.

The disclosure is generally directed to strollers with a reversible handle and improved latch and pivot arrangements for securing the handle in various positions. In some cases, the improved pivot arrangements may also facilitate the folding of the strollers from an in-use configuration to a folded configuration. Generally speaking, the latch and pivot arrangements described herein provide a number of advantages related to safe use and operation of the strollers.

Some aspects of the disclosure are generally directed to latch and pivot arrangements free of exposed sheer, crushing, or other pinch points formed by hard stops and other situations during movement of the handle or the frame. Avoiding or eliminating pinch points may be especially useful in reversible handle situations because the child may be seated in the stroller during the movement of the handle. In some cases, latch components are internal or enclosed such that the hard stops are also enclosed. In these and other cases, one or more components of a pivot assembly may also be substantially hidden. The same components used to enclose or house latch assembly components may also constitute components of a pivot assembly. For example, such common or shared components may include a hub having a cam housing paired with a cam cover. In such cases, the hard stops defining the positions of the handle are disposed or housed within the hub between the cam housing and the cam cover. As described below, the hard stops may be provided by fingers (or other projections) and slots with which the fingers are engaged within the hub.

Other aspects of the disclosure are directed to eliminating hard stops from the exposed portions of a handle latch assembly by ensuring that the handle latch remains released during movement between handle positions. To this end, a bias track or other latch guide may be engaged by a projection of the latch assembly. In those cases, the latch guides generally prevent the projection from moving from a released state to a latched state until the handle is disposed in a position in which it can be secured by the latch assembly.

Still further aspects of the disclosure are generally directed to the foldable nature of the strollers. In some cases, a folded or storage configuration of the strollers is made possible by one or more fold latches integrated to various extents with the components responsible for reversing the handle. The fold and handle latches may share a number of components to simplify the construction of the stroller, as well as address pinch point and other challenges of the latches in an integrated fashion.

Although the strollers described below are configured with a handle that can move between normal and reversed positions, a number of aspects of the disclosure are not limited to strollers with only two handle positions. Similarly, several aspects of the disclosure are not limited to having only two frame configurations (e.g., an in-use configuration and a folded configuration). Instead, the features described below may be applied to strollers having any number of handle positions and any number of frame configurations. Indeed, the disclosed latch and pivot arrangements are well suited for a variety of different stroller frames and handles. For example, the disclosed features are not limited to stroller handles having elongated push bars even though the pinch forces may be significant in such cases. For these and other reasons set forth below, the term "reversible" is used herein in a broad sense to include a variety of adjustments in handle orientation. Similarly, the term "folded" is also used herein in a broad sense to include a variety of adjustments to the relative position of the frame components.

Although especially useful in connection with eliminating pinch points for the child seated in the stroller, the latch and pivot arrangements described below present a number of other advantages. For example, the integration and sharing of components between the handle and fold latch assemblies, as well as the pivot assemblies, simplify the operation, assembly and use of the disclosed strollers.

Figure 2:
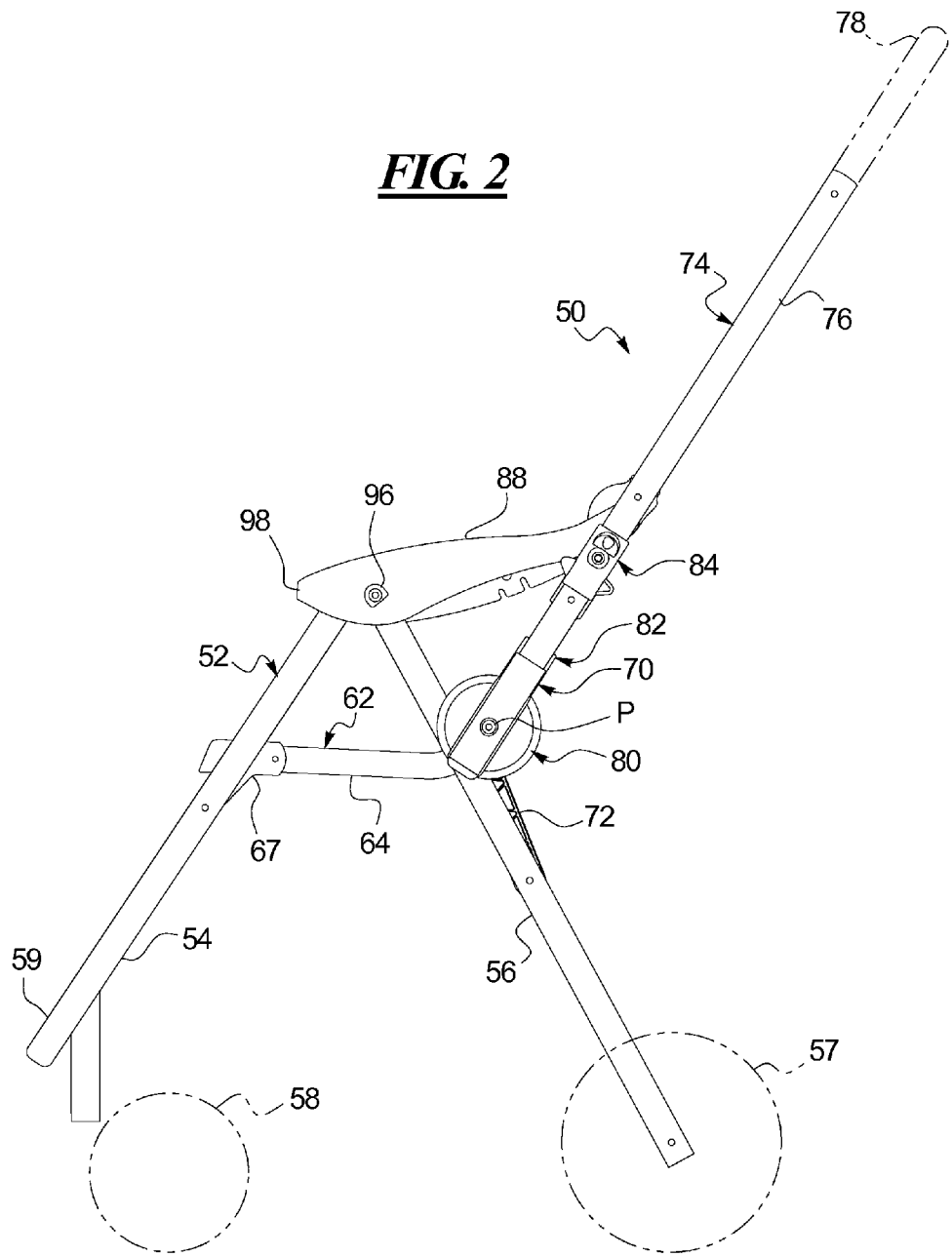
FIG. 2 shows an elevational, side view of the stroller of FIG. 1 in the in-use configuration and the handle in the normal position.

Turning now to the drawing figures, FIGS. 1 and 2 show a stroller 50 constructed in accordance with several aspects of the disclosure. The stroller 50 has a stroller frame assembly 52 with a pair of front legs 54 and a pair of rear legs 56. Each rear leg 56 terminates at a respective rear wheel 57 schematically shown in phantom. Two front wheels 58 (also shown in phantom) are disposed near lower ends 59 of the front legs 54, which may terminate at respective front wheel assemblies (not shown). In this example, the upper ends of the front legs 54 and the rear legs 56 are pivotally connected to one another via a respective leg pivot joint 60 (FIG. 1). The lower ends of the rear legs 56 are connected via a cross brace 61 (FIG. 1).

The front and rear legs 54, 56, and other components of the frame assembly 52 generally support a seat frame assembly 62 above a ground surface. The seat frame assembly 62 has a cross member 63 (FIG. 1) extending between the front legs 54 and a pair of side bars 64 extending rearward from the cross member 63. These and other components of the seat frame assembly 62 and, more generally, the frame assembly 52 support a seat 66 shown in phantom in FIG. 1. The seat 66 may include a number of different components, including a seat bottom platform, a seat back, seat sides or bolsters, and a seat tray, as well as the soft goods covering such components, for safely supporting a child seated in the stroller 50. One or more of these components, including the soft goods, may be utilized in securing the attachment of the seat 66 to the seat frame 62 or the stroller frame 52. The design, shape, size, and other characteristics of these components of the seat 66 may vary considerably.

The configuration and components of the frame assembly 52 and the seat frame assembly 62 may also vary considerably from the example shown. For example, the shape and other characteristics of the front and rear legs 54, 56 may be modified to accommodate different wheel arrangements and frame designs. The manner in which the front legs 54 are coupled to the seat frame assembly 62 may also vary considerably, and need not include a pair of connector assemblies 67 as shown. A cross brace 68 coupling the front legs 54 may also be absent given alternative frame designs and wheel arrangements.

A pivot and latch assembly 70 is positioned on each side of the seat frame assembly 62 and, more generally, the stroller frame 52. The side bars 64 of the seat frame assembly 62 are pivotally coupled to a respective one of the pivot and latch assemblies 70. Also pivotally coupled to the pivot and latch assemblies 70 are fold links 72, each of which adjustably connects one of the side bars 64 to one of the rear legs 56. Each fold link 72 is pivotally coupled at its lower end to the corresponding rear leg 56. An upper section of each fold link 72 is connected to the pivot and latch assembly 70 and will drive folding of the rear legs 56 and the front legs 54 toward one another as the frame assembly 52 folds.

The frame assembly 52 also has an adjustable or reversible handle assembly 74 for pushing and maneuvering the stroller 50. The handle assembly 74 has a pair of push bars 76 extending upward from the other components of the frame assembly 52 to reach a handle grip 78 (shown in phantom) of the handle assembly 74. The handle grip 78 generally extends between the upper ends of each push bar 76, and may be integrally formed therewith. The lower end of each push bar 76 is pivotably coupled to the rest of the frame assembly 52 via a respective one of the pivot and latch assemblies 70. The shape, size, configuration, and other characteristics of the push bars 76, the handle grip 78, and other components of the handle assembly 74 may vary from the example shown.

Each pivot and latch assembly 70 includes a pivot joint assembly 80, a fold latch assembly 82, and a handle latch assembly 84. The pivot joint assembly 80 supports motion of the handle 74 and other frame components about a pivot axis P indicated schematically as a pin shown in phantom. In this way, the handle 74 is reversible or otherwise adjustable, and the frame 52 is foldable about the same pivot axis P. The position of the handle 74 in this example is adjustable between a normal position and a reversed position. FIGS. 1 and 2 depict the normal handle position, in which the handle 74 extends rearward from the pivot joint assembly 80. The reversed position and movement between the positions are described below. The handle latch assembly 84 is generally directed to securing the handle 74 in the normal and reversed positions, but may be adapted to accommodate any number of handle positions.

The pivot joint assembly 80 is structurally integrated with a number of components of the two latch assemblies 82, 84. In this example, several aspects of these assemblies are integrated. For instance, certain components of the assemblies reside in a shared housing or enclosure. The assemblies also share certain components. These and other components of the pivot and latch assemblies are generally configured in accordance with several aspects of the disclosure and are described in further detail below. For ease in illustration, the fold latch assembly 82 and the handle latch assembly 84 are generally indicated in FIGS. 1 and 2 by reference to their respective components that are separated from the pivot joint assembly 74.

The frame assembly 52 includes a latch carrier bar 86 that supports a number of components of the pivot and latch assemblies. Using the latch carrier bar 86, the fold latch assembly 82 and the handle latch assembly 84 form connections involved in the folding of the frame 52 or the positioning of the handle 74. In this example, the latch carrier bar 86 extends upward and rearward from the pivot and latch assembly 70. As best shown in FIG. 2, the latch carrier bar 86 and the push bars 76 are disposed in a common plane when the handle 74 is in the normal position. Each latch carrier bar 86 is spaced laterally inward from the corresponding push bar 76 of the handle 74.

The frame assembly 52 includes armrest links 88 that run from upper ends of the latch carrier bar 86 to the connection of the upper ends of the front and rear legs 54, 56. In this way, the armrest links 88 act as spaced-apart longitudinal connectors of the frame assembly 52 on either side of the seat frame assembly 62. In this example, each armrest link 88 couples the leg pivot joint with the latch carrier bar 86, which, in turn, is coupled to the inner side of the pivot assembly 80 on each side of the stroller 50. The armrest links 88 are generally configured to facilitate the folding of the frame assembly 52 to the storage or folded configuration. To that end, the armrest links 88 are pivotably connected to the latch carrier bar 86 and to the front and rear legs 54, 56. As a result, the front and rear legs 54, 56 move toward one another as the frame 52 is folded, such that the front wheels 58 move rearward, and the rear wheels 57 move forward. In this example, each armrest link 88 is a molded component with a generally flat, upper surface and downward extending sides configured to form a channel in which the front and rear legs 54, 56, and the latch carrier bar 86, rotate during movement between the in-use and folded configurations. This exemplary lateral cross-sectional shape of the armrest link 88 is shown in FIG. 1, inasmuch as one of the armrest links 88 is fragmented to reveal components of the handle latch assembly 84. While each exemplary arm-rest 88 has a lateral cross-section shaped like a flattened arch, a variety of other shapes and configurations may be used to accommodate the pivotal motion of the frame components. Moreover, alternative frame assemblies may include multiple components to provide the armrest and longitudinal link or connection features of the armrests 88 separately.

Figure 3:
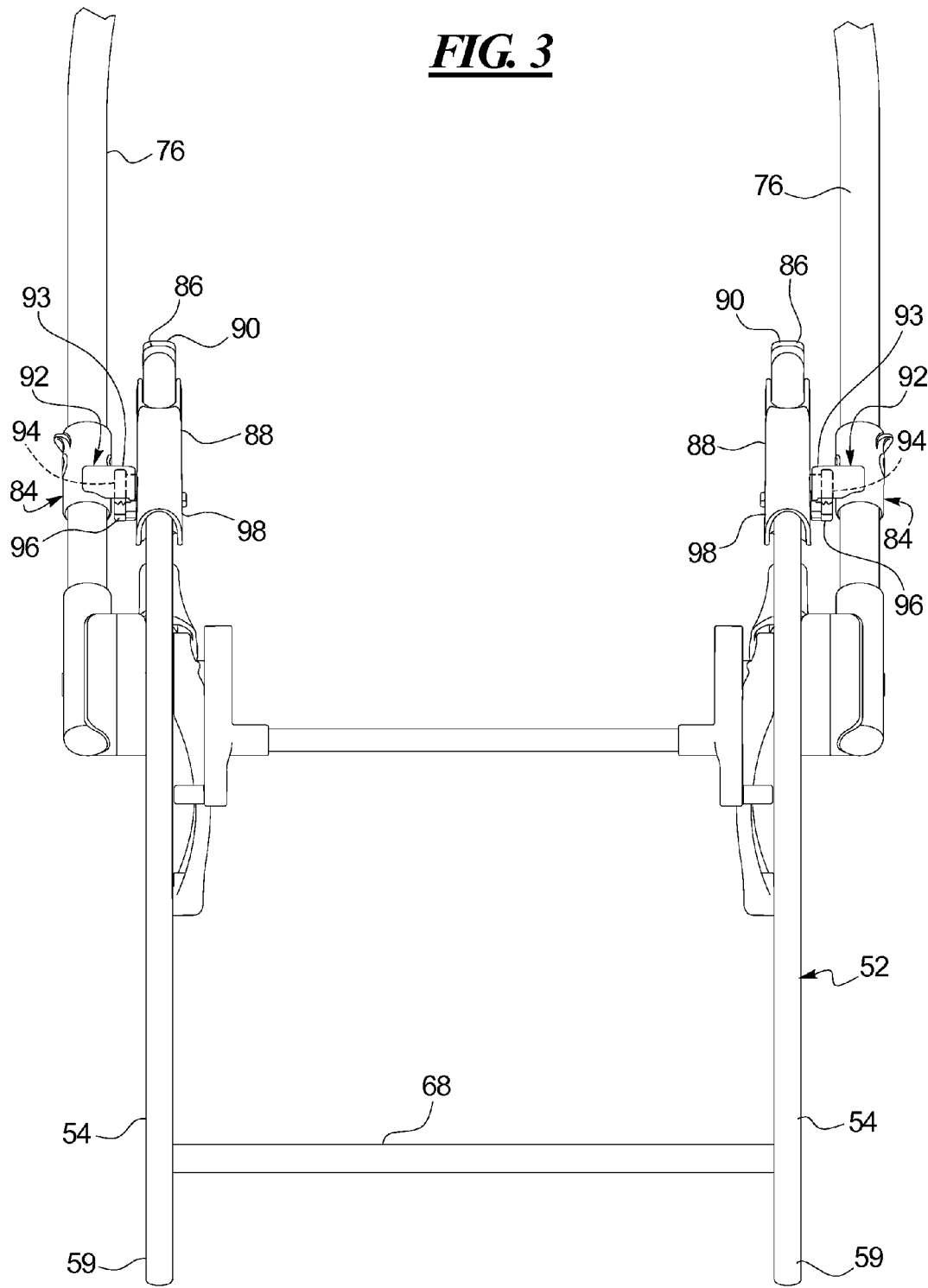
FIG. 3 shows an elevational, front view of the stroller of FIG. 1 in the in-use configuration and the handle in the normal position.

With reference now to FIG. 3, a front view of the frame assembly 52 is shown to illustrate the relative positioning, alignment, and parallel orientation of several of the above-described components. Starting from an exterior side of the frame assembly 52, the handle push bar 76 is spaced laterally outward from the latch carrier bar 86, the upper end of which terminates at a cap 90 positioned above and rearward of the rearmost extent of the armrest link 88. The spacing of the push bar 76 and the plane in which the latch carrier bar 86 and the armrest link 88 lie is sufficiently wide to ensure that pinch points are not created between these components for a child or caregiver. For example, the width of the spacing may be greater than a child finger or an adult finger. The push bar 76 is similarly spaced from the armrest link 88, the front leg 54, and the rear leg 56 because each of these components of the frame 52 is aligned with the latch carrier bar 86 in a common plane. As also shown in FIGS. 1 and 2, the handle push bars 76 are arranged in parallel with the latch carrier bars 86 in this example.

A latch 92 of the handle latch assembly 84 is slidably carried by the push bar 76 near but spaced upward from a lower end of each push bar 76. Each latch 92 projects laterally inward and, consequently, is disposed in the spacing between the latch carrier bar 86 and the push bar 76. In this example, the latch 92 includes a projection 93 configured to extend the entire width of the spacing. As a result, the armrest link 88 acts as a track or rail that the latch 92 runs along and against as the push bar 76 moves during handle repositioning Thus, despite the projection 93 of the latch 92, pinch points between these components are also avoided, insofar as the latch 92 is continuously disposed in or near contact with the track of the armrest link 88. As described below, the latch 92 is configured to receive and engage a latch tab 94 (shown in phantom) of the handle latch assembly 84 for the normal handle position. The latch tab 94 is carried on an upper end of the latch carrier bar 86 and mounted to project laterally outward from the latch carrier bar 86 toward the push bar 76. To this end, the tab 94 is positioned toward the rear of the armrest link 88 and, more generally, the stroller 50. The tab 94 may be referred to herein as the "normal position tab." A reverse position latch tab 96 of the handle latch assembly 84 is mounted near a forward end 98 of each armrest link 88 for the reversed handle position. The reverse position tab 96 is more clearly shown in FIGS. 1 and 2, and is shown in cutaway in FIG. 3 to reveal the engagement of the normal tab 94 and the projection 93.

Figure 4:
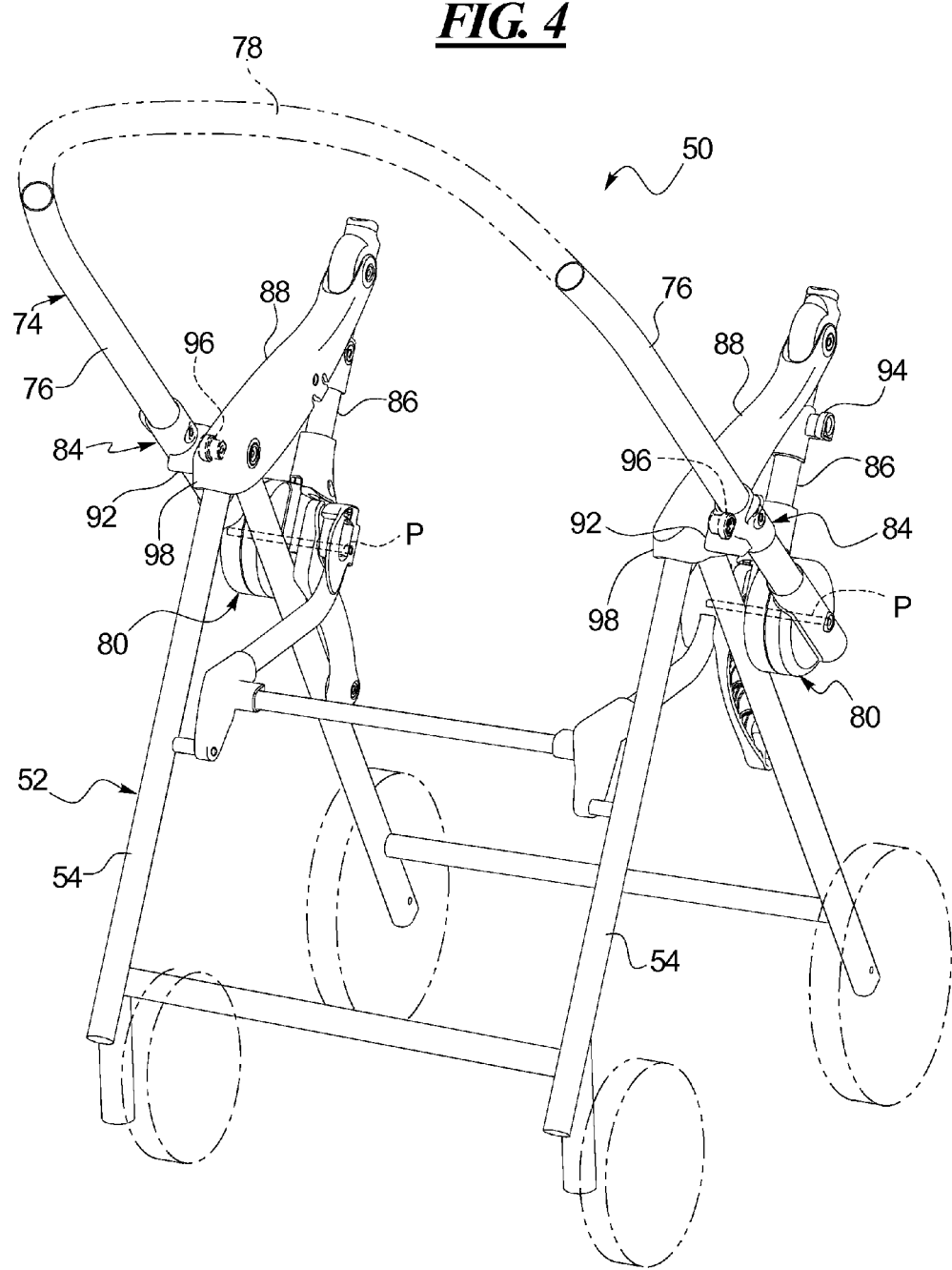
FIG. 4 shows a perspective, front view of the stroller of FIG. 1 in the in-use configuration but with the handle in a reversed position.
Figure 5:
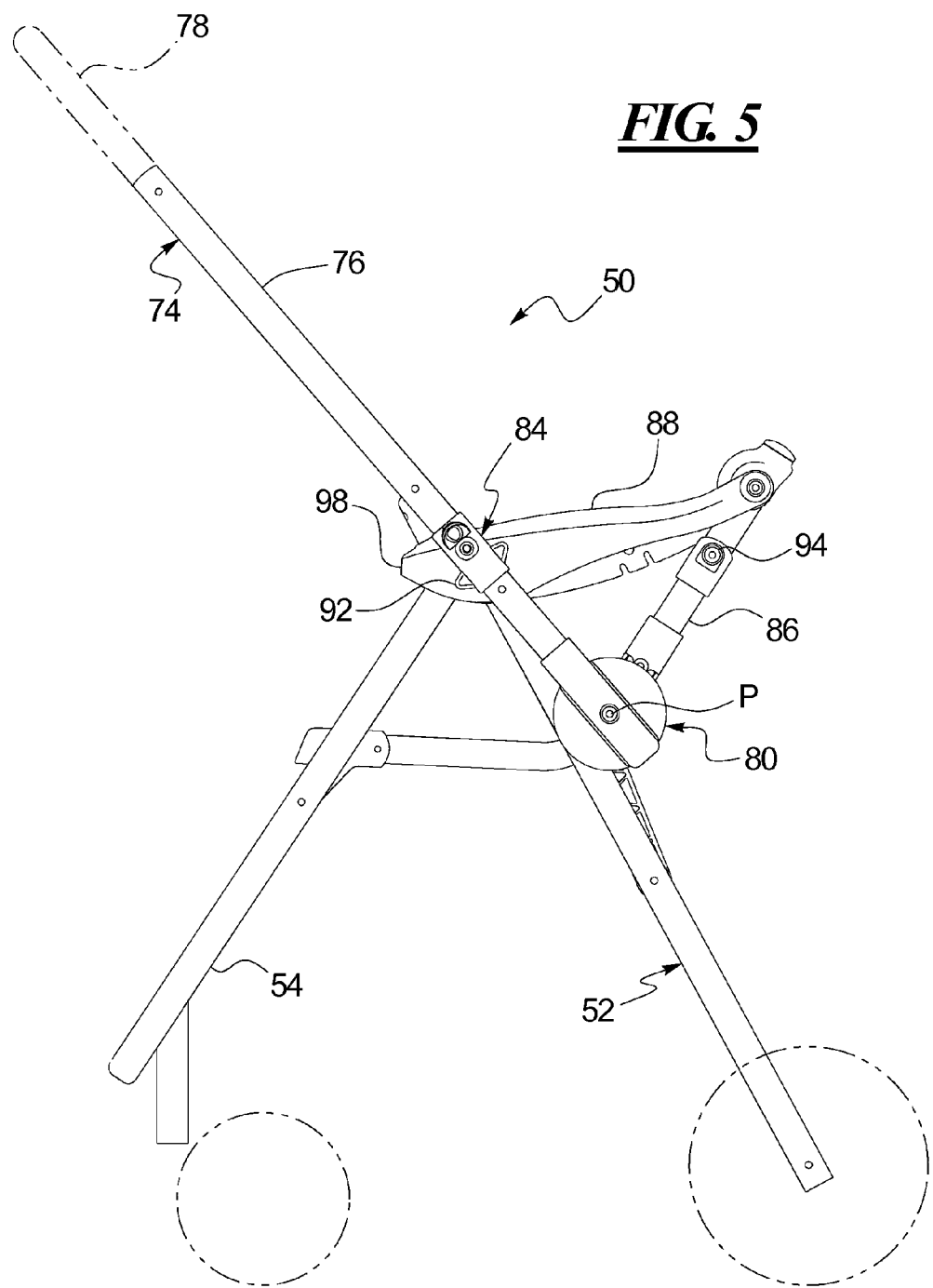
FIG. 5 shows an elevational, side view of the stroller of FIG. 1 in the in-use configuration and the handle in the reversed position.

Turning now to FIGS. 4 and 5, the stroller 50 is shown with the handle 74 in the reversed position. To move the handle from the normal position, each handle latch 92 may be disengaged or released from the corresponding latch tab 94 via an actuator 100, which is only schematically shown in FIG. 1 because its construction may vary considerably. As described below, the actuator 100 may alternatively be coupled to the fold latch assembly 82. In any event, the actuator 100 or other actuation mechanism is operated to overcome return springs of the latch assemblies 82, 84 as described below. The portion of the actuator 100 engaged by a caregiver may be positioned at any convenient location on the frame assembly 52, such as the handle grip 78. In the example shown, the handle latch 92 may be released by a caregiver pulling upward on a pull tab or other component of each latch 92 as described below. Upon disengaging or releasing the handle latch assembly 84, the caregiver can then move the handle 74 between the normal and reversed positions by applying force to the handle grip 78 or the push bars 76. The handle 74 then rotates about the pivot axis P via the pivot joint assembly 80 until reaching a stop located within the assembly 80. As described further below, the stop is not established or provided by the latch tabs 94, 96, or the latch 92. Such internal or non-exposed stops prevent the formation of possible pinch points during adjustments of the handle position, which may be especially helpful considering the proximity of the child's hands on the armrest links 88.

Once secured in the reversed position, the handle 74 extends forward and upward from the pivot joint assembly 80. Generally speaking, the handle 74 is now positioned such that the caregiver can grasp the handle grip 78 while facing the seat 66 (FIG. 1) to walk and push the stroller 50 in the reverse direction. In this example, the push bars 76 of the handle 74 pass near the forward ends 98 of the armrest links 88, thereby establishing the respective engagement of each latch 92 and each tab 96. However, in other cases, the position of the handle 74 may be varied to include additional or alternative orientations, including one in which the handle 74 extends in a more horizontal direction to accommodate a shorter caregiver. In such cases, additional or alternative latch tabs (not shown) may be carried or mounted on the front legs 54. More generally, any number of latch tabs may be mounted on the frame 52 at various positions to support any number of handle positions or orientations.

During movement of the handle 74, the latch carrier bars 86 and the armrest links 88 remain stationary. In this way, the latch tabs 94 remain in place for a subsequent adjustment back to the normal handle position. Moreover, the spacing between the armrest links 88 and the push bars 76 remains the same, such that each latch 92 continues to ride along a corresponding one of the armrest links 88. With the latch 92 and the armrest link 88 still close-fitting or contiguous, no pinch points are created during the movement.

Figure 6:
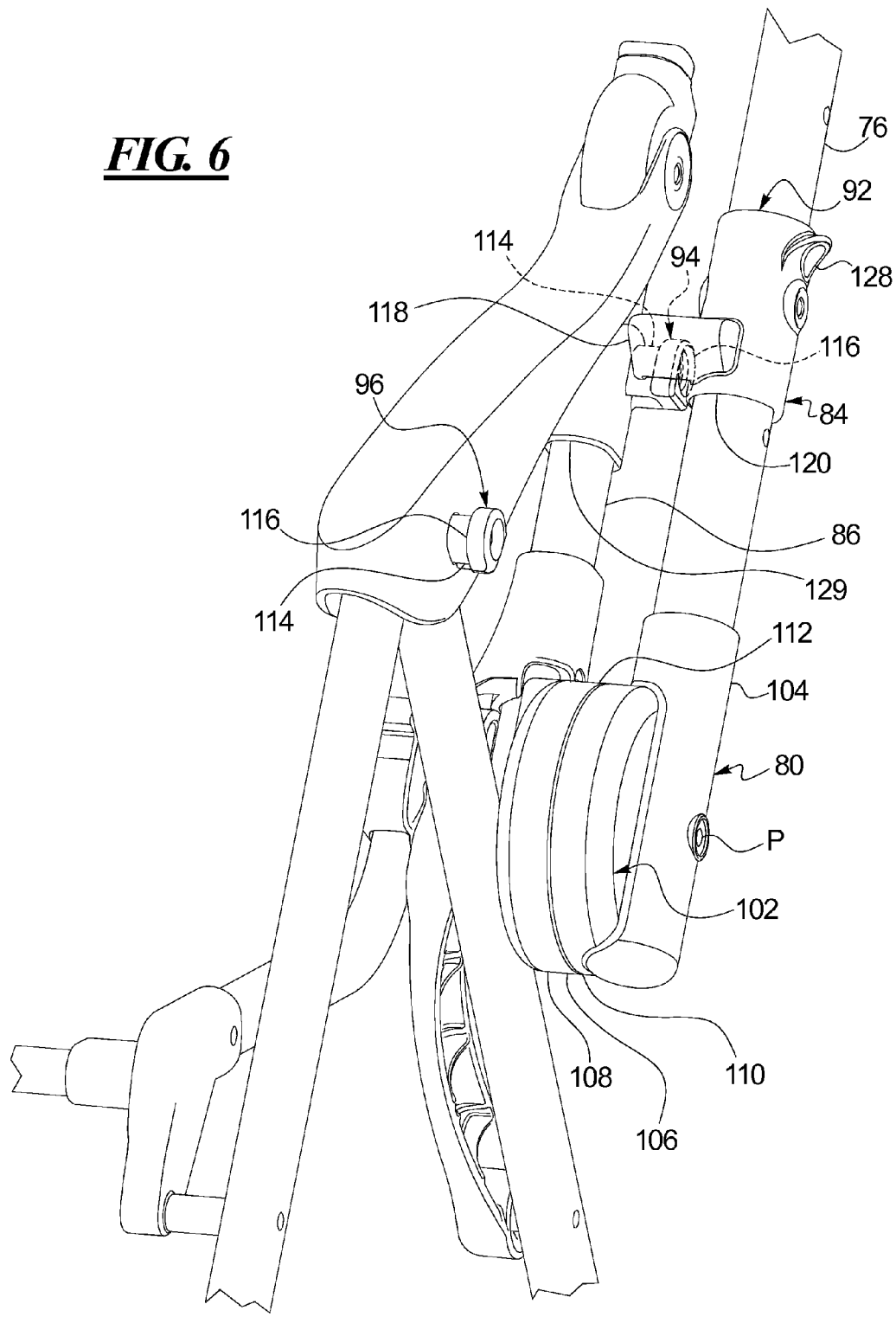
FIG. 6 shows a detailed, perspective view of an exemplary pivot and latch assembly of the stroller of FIG. 1 in which both a handle latch and a fold latch are in a latched state, the stroller is in the in-use configuration, and the handle is in the normal position.
Figure 7:
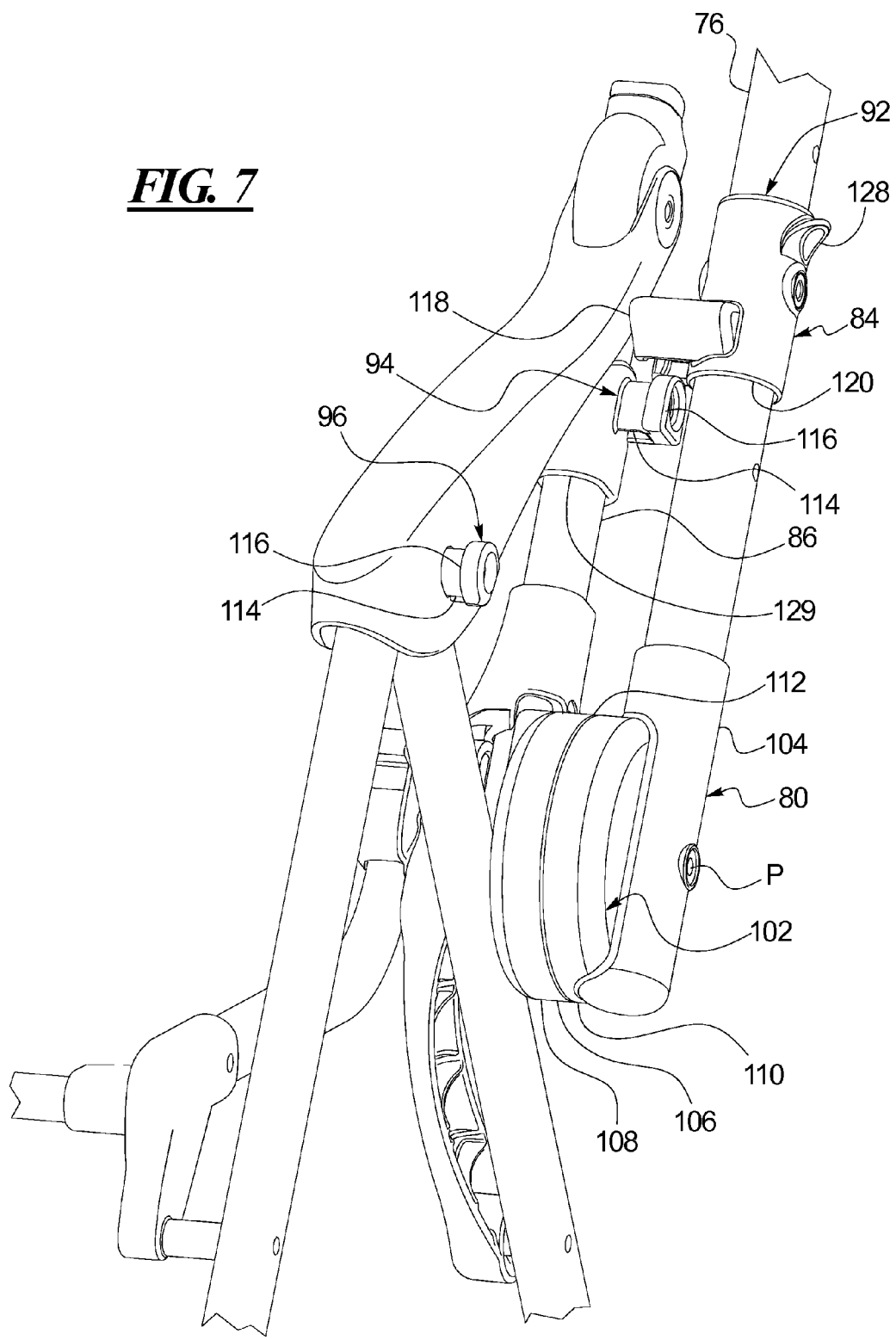
FIG. 7 shows a detailed, perspective view of the pivot and latch assembly of FIG. 6 in which the handle latch is in a released state, the fold latch is in a latched state, the stroller is in the in-use configuration, and the handle is in the normal position.
Figure 8:
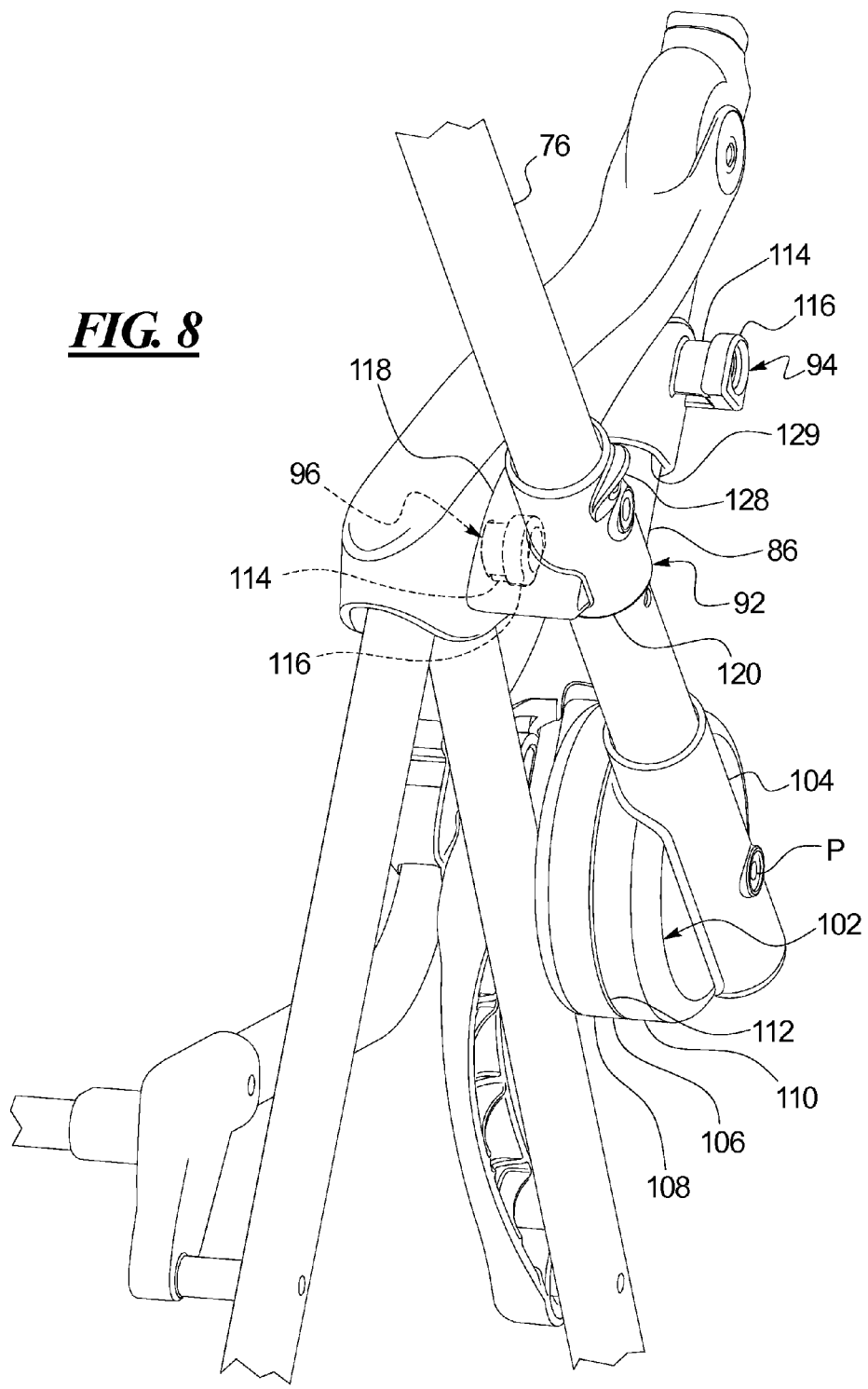
FIG. 8 shows a detailed, perspective view of the pivot and latch assembly of FIG. 6 after the handle has been moved from the normal position to the reversed position.

With reference now to FIGS. 6-8, the components and operation of the exemplary pivot joint and handle latch assemblies 80, 84 are now described in greater detail. The pivot joint assembly 80 includes a hub 102 coupled to a mounting sleeve 104 that receives the lower end of the push bar 76. In this example, the mounting sleeve 104 is integrally formed with or otherwise affixed to an exterior face of the hub 102. The hub 102 has a two-piece shell 106 that encloses components of both the handle latch assembly 84 and the fold latch assembly 82. The enclosure (or other internal disposition) of these components is one aspect of the disclosed strollers that helps to avoid pinch points as described herein. In this example, the shell 106 includes an inner casing 108 and an outer casing 110, each of which is centered on the pivot axis P. The inner and outer casings 108, 110 are shaped to abut or meet along a circular interface 112 to enclose the latch components and form the hub 102. The outer casing 110 is integrally formed with the mounting sleeve 104 and rotatable therewith about the pivot axis P to support the movement of the handle push bar 76 between the normal position (FIG. 6) and the reversed position (FIG. 8). An inner face of the inner casing 108 is secured to the latch carrier bar 86, and remains stationary with respect to the pivot axis P during handle repositioning. As described below, this exemplary pivot and latch assembly relies upon an internal cam (FIGS. 13A, 13B) to control the handle movement, in which case the outer casing 110 acts as a cover for the cam (referred to herein as a "cam cover"), and the inner casing 108 acts as a housing for the cam (referred to herein as a "cam housing"). Thus, each pivot assembly 80 in this example has one of the cam housings 108 positioned at the lower end of the respective handle push bar 76 and the latch carrier bar 86. Each cam housing 108 is affixed to the latch carrier bar 86 on each side of the frame 52. As described below, the cam covers 110 pivot with the handle push bars 76 between the normal and reverse positions, but the cam housings 108 are stationary and fixed to the latch carrier bars 86.

Figure 9:
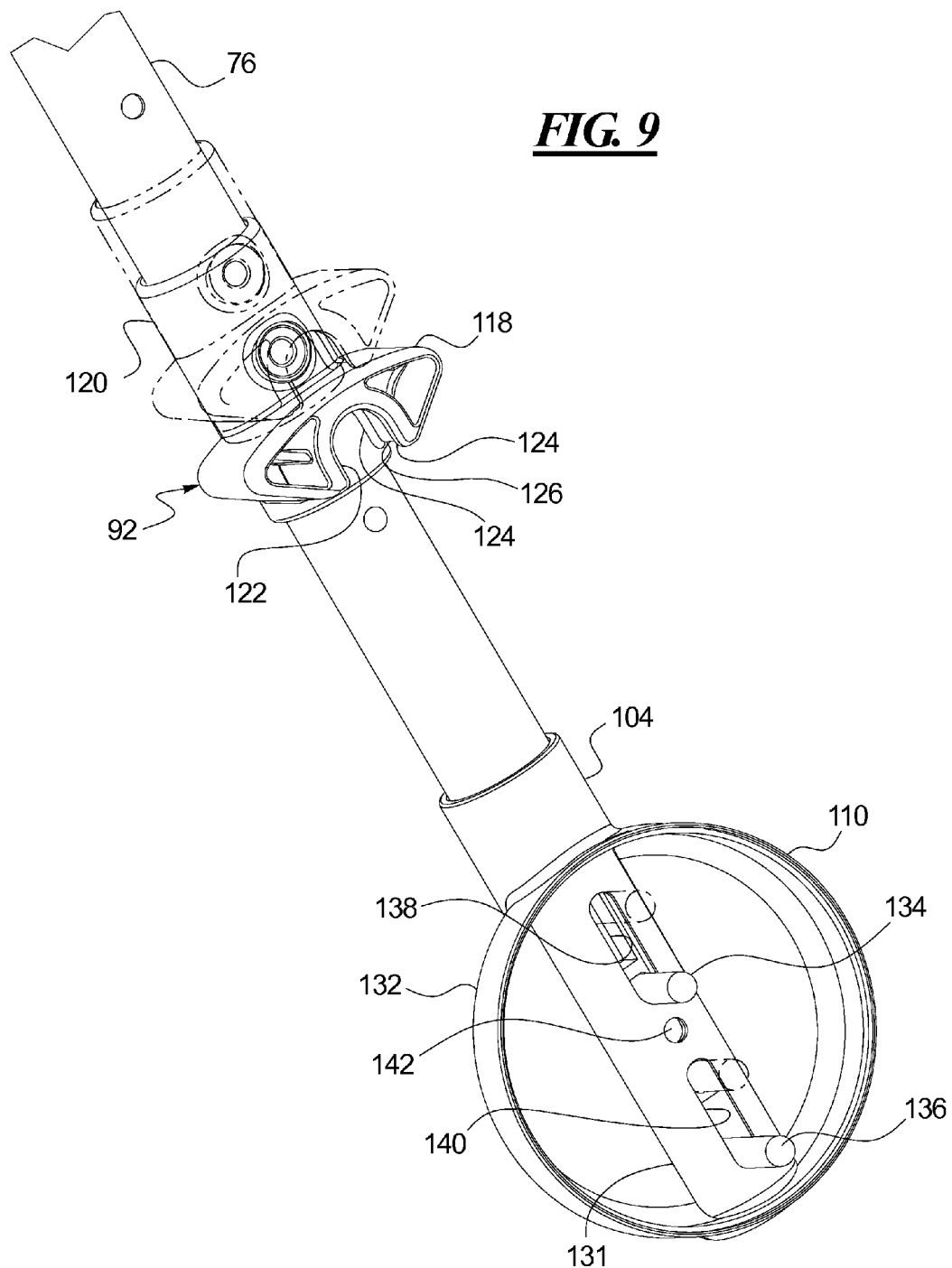
FIG. 9 shows a partial, perspective view of the pivot and latch assembly of FIG. 6 to depict the positions of a number of exemplary components of the pivot and latch assembly in the latched state of the fold and handle latches, with the released state thereof shown in phantom.

FIGS. 6-8 show the components of the handle latch assembly 84 external to the hub 102 while residing in the normal handle position, during a latch release operation, and while residing in the reversed handle position. In this example, each tab 94, 96 has a generally bolt-shaped body 114 that terminates at an expanded or knob-shaped head 116 engaged by a clasp 118 of the latch 92. The clasp 118 extends inwardly from a sleeve 120 slidably mounted on the push bar 76. As best shown in FIG. 9, the clasp 118 has a generally C-shaped body with a slot 122 with spaced-apart ridges 124 on either side of a groove 126 shaped to capture the head 116 of each tab 94, 96.

The operation of the handle latch assembly 84 is based upon movement of the latch 92 between a seated position on one of the tabs 94, 96 and an elevated position spaced from the tabs 94, 96. FIG. 7 depicts the latch 92 and, more specifically, the clasp 118 spaced from the tab 94. With the latch 92 separated from the tab 94, the handle latch assembly 84 is released or unlatched, and the handle push bar 76 is freed for movement about the pivot axis P. To this end, the sleeve 120 of the latch 92 is capable of sliding, axial movement along the push bar 76 between the positions best shown in FIG. 9. The latch 92 may be driven in a variety of ways, including, for instance, a thumb or finger tab 128 disposed on a laterally outward face of the sleeve 120. To elevate the clasp 118 and release the latch 92, a caregiver pulls upward on each tab 128. Alternatively or additionally, the latch 92 may be driven by an actuator engaged by the caregiver, such as the actuator 100 (FIG. 1). Further details regarding the actuation of the latch receiver 92 are described below in connection with the exemplary embodiment shown in FIGS. 10-12.

The construction, mounting, configuration, shape, positioning, and other characteristics of the tabs 94, 96, and the latch receiver 92 may vary considerably from the example shown. The tab 94 need not be secured to the latch carrier bar 86 via a mounting sleeve 129 as shown. The mounting sleeve 129 may also vary, and may include a variety of components that extend, for instance, laterally outward from the latch carrier bar 86 to support the body 114 and the head 116 of the tab 94. Moreover, these components relating to the tab 94 need not be integrally formed as shown.

FIG. 9 depicts one of the handle push bars 76 and a respective one of the cam covers 110 affixed to a lower end 131 of the push bar 76. As shown and described above, the handle latch 92 is carried on the push bar 76 and spaced from the cam cover 110 to allow sliding along the push bar 76 between a latched position and an unlatched position (shown in phantom). In this example, the cam cover 110 has a bowl- or cup-shaped shell 132 integrally formed with the mounting sleeve 104 that receives the push bar 76. Insertion of the push bar 76 into the mounting sleeve 104 positions the lower end 131 of the push bar 76 within the space defined by the cup-shaped shell 132 as shown.

Upper and lower fingers 134, 136 project inward from the push bar 76 within the cam cover 110. The fingers 134, 136 are movable along upper and lower axial slots 138, 140 in the lower end 131 of the push bar 76. The upper slot 138 extends along the push bar 76 above a pivot pin aperture 142 for the pivot axis P (FIGS. 6-8), while the lower slot 140 extends along the push bar 76 below the pivot pin aperture 142. Each finger 134, 136 can travel axially along the push bar 76 between positions defined by the slots 138, 140. In this example, the lower finger 136 is a handle latch follower, while the upper finger 134 is a fold latch lifter. Thus, the lower finger 136 travels from a lower position to a higher position (shown in phantom) as the latch 92 slides between the latched and unlatched positions shown in FIG. 9. The fingers 134, 136 need not be pin-shaped as in the example shown, but rather may be shaped as any projection from the handle configured to engage the other components of the latch assemblies 82, 84. Further details regarding the upper finger and fold latch lifter 134 are provided below.

Figure 10:
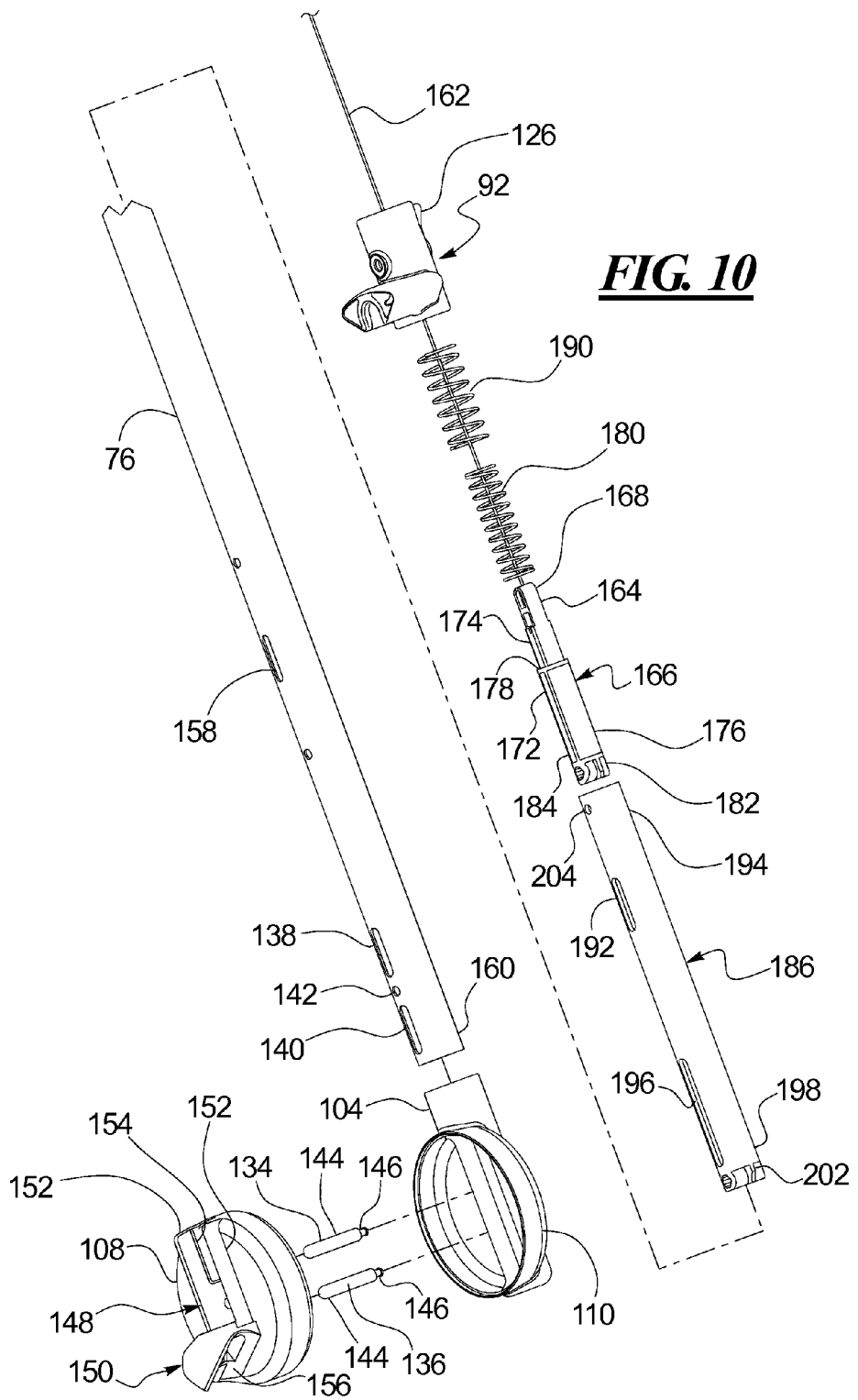
FIG. 10 shows an exploded, partial, perspective view of the components of the pivot and latch assembly shown in FIG. 9 with a pivot or cam housing of the pivot and latch assembly.
Figure 13A:
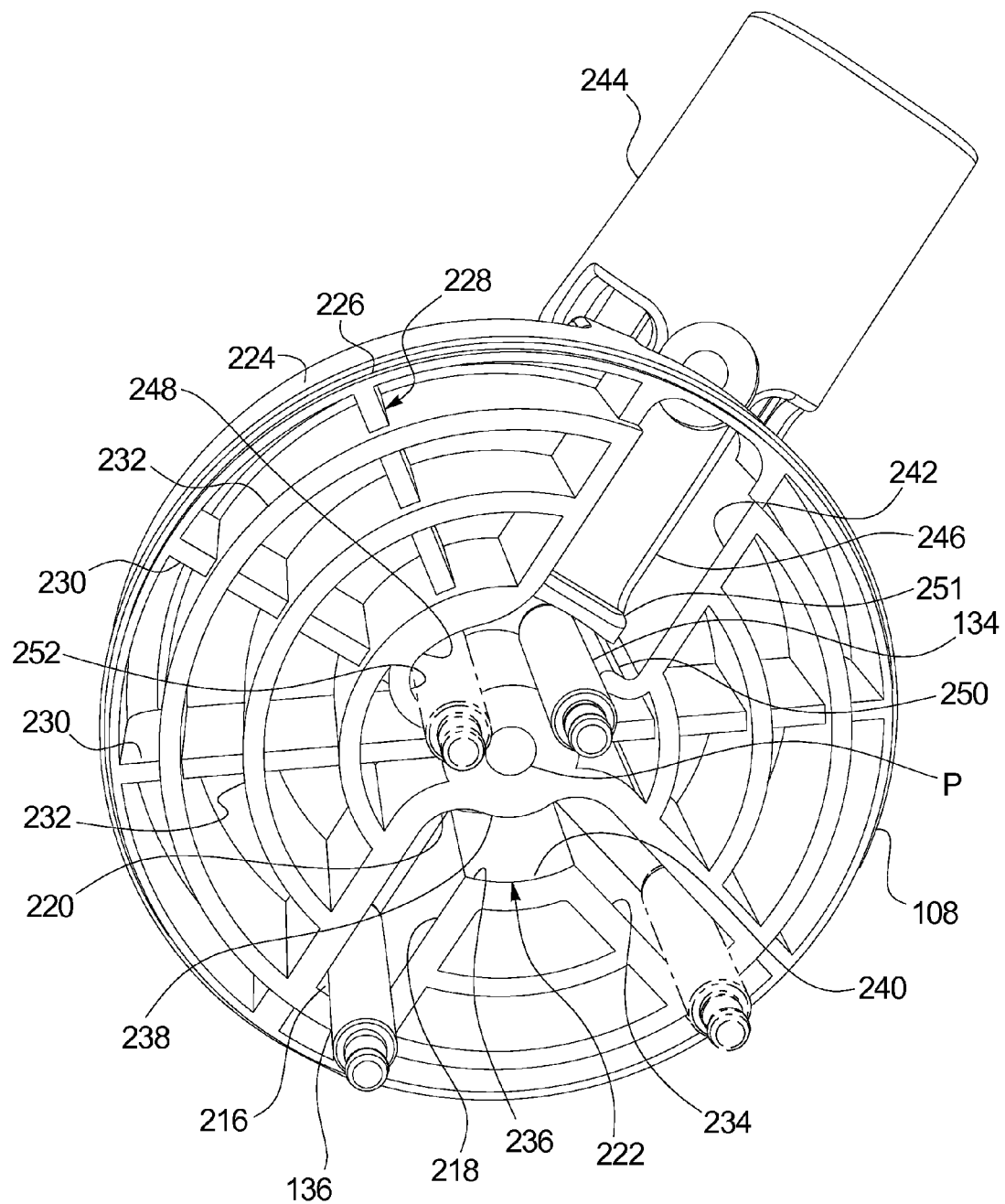
FIG. 13A shows a perspective view of an exemplary cam housing of the pivot and latch assembly of FIG. 6 having latch projections or fingers in latched positions for the in-use configuration and the normal handle position, with the reversed handle position shown in phantom.
Figure 13B:
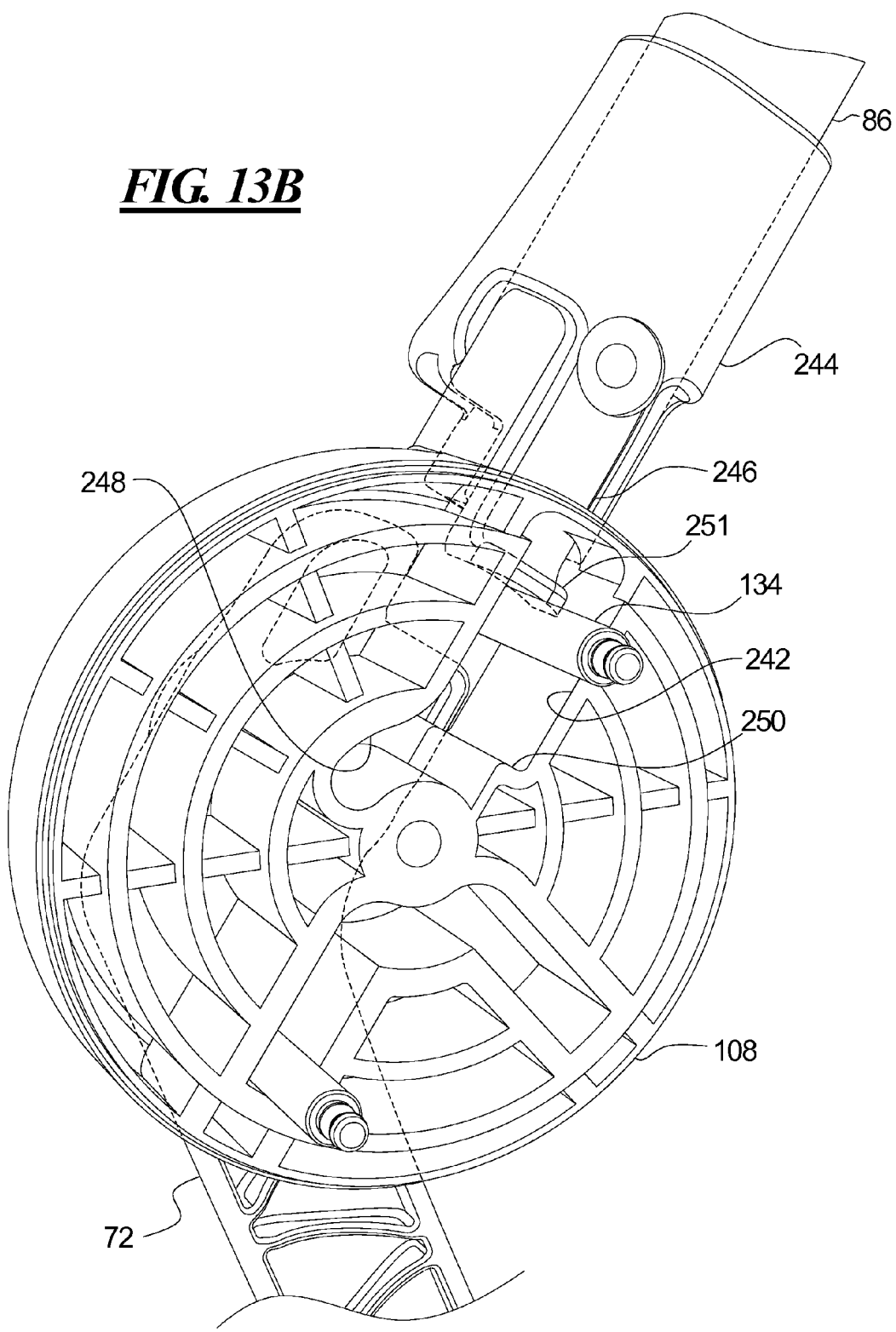
FIG. 13B shows a perspective view of the cam housing of FIG. 13A after the latch finger of the fold latch has been moved to a released position.

FIG. 10 shows a number of components of the fold latch assembly 82 and the handle latch assembly 84 that are carried in or by each of the push bars 76. The cam cover 110 is separated from the push bar 76 to reveal the slots 138, 140 in which the fingers 134, 136 travel. Each finger 134, 136 includes a pin-shaped body 144 sized for movement in the slots 138, 140, and a narrowed tip 146 configured to engage grooves or other areas (not shown) in the cam cover 110. The fingers 134, 136 also travel within slots defined by the interior components of the cam housing 108, an example of which is shown in FIGS. 13A and 13B. On an external face that corresponds with the laterally inward face of the hub 106 (FIG. 6), the cam housing 108 has a fold latch receiver 148 and a leg brace 150. The fold latch receiver 148 includes a pair of walls 152 that project outward from the external face of the cam housing 108. As described below, the space between the pair of walls 152 is configured to align a fold latch of the fold latch assembly 82 with an end of the fold link 72 (see, e.g., FIGS. 14A and 14B). A pass-through 154 is located between the pair of walls 152 to allow the fold latch lifter 134 to act on the fold latch. The leg brace 150 has a curved seat 156 to capture one of the rear legs 56 and thereby increase structural rigidity of the frame assembly 52 (FIGS. 1-4) when the stroller 50 is oriented in the in-use configuration.

The push bar 76 has another slot 158 positioned upward from a lower end 160 of the push bar 76 for accepting a bolt, pin or other fastener 161 (FIG. 11) that slidably secures the latch 92 to the push bar 76. The fastener 161 travels within the slot 158 as the latch 92 moves between the latched and unlatched positions. To that end, the slot 158 may have an axial length equal to that of the slot 140 in which the handle latch follower 136 travels.

The remainder of the components shown in FIG. 10 are disposed within the push bar 76. A cable 162 extends within each push bar 76, running from, for instance, the actuator 100 (FIG. 1) to an upper end 164 of a fold latch shuttle or slider 166. Generally speaking, the fold latch lifter 134 projects from and is carried by the fold latch shuttle 166, such that upward motion of the cable 162 drives the fold latch lifter 134 upward to release the fold latch assembly 82. In this example, the upper end 164 of the fold latch shuttle 166 has a dome-shaped connector 168 for capturing a nub 170 (FIG. 11) at the end of the cable 162. The fold latch shuttle 166 has an axially elongated body 172 with an upper section 174 and a lower section 176. In this example, the body 172 is a molded component. The upper and lower sections 174, 176 are of different radial widths and therefore meet to form a shelf 178 that acts as a seating surface for a bias spring 180. The upper section 174 is narrow enough to allow the spring 180 to slide over the upper section and bear against the shelf 178 to bias the fold latch shuttle 166 to a downward latched position. The fold latch shuttle 166 has a guide 182 at its lower end 184 to receive the fold latch lifter 134. In this example, the guide 182 has a generally tubular shape through which the pin-shaped body 144 of the fold latch lifter 134 passes. The guide 182 also has a snap-feature to capture the fold latch lifter 134 via engagement of the tip 146. The shape of the upper and lower sections 174, 176 of the fold latch shuttle 166 may vary from the example shown, and may include a number of ribs and other features to facilitate the production of the molded component.

Figure 11:
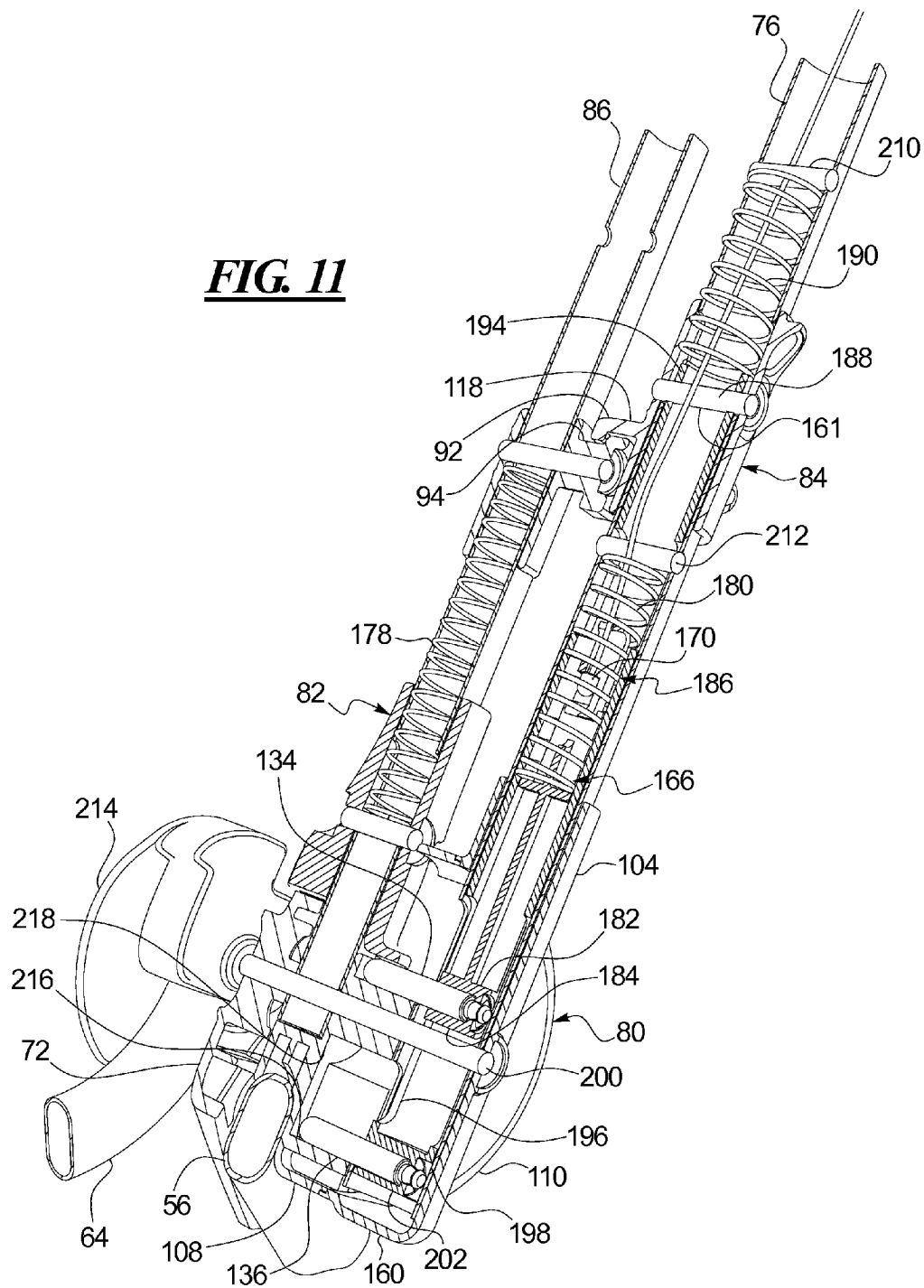
FIG. 11 shows a cutaway, perspective view of the pivot and latch assembly of FIG. 6 in which both of the handle and fold latches are in the latched state.

A second shuttle (or handle latch shuttle) 186 is also housed within each of the push bars 76. Each handle latch shuttle 186 surrounds the respective fold latch shuttle 166 in the corresponding push bar 76. In this example, the handle latch shuttle 186 is generally tubular. More generally, the handle and fold latch shuttles 186, 166 are generally configured so that the fold latch shuttle 166 can telescope within the handle latch shuttle 186, which, in turn, can telescope within the push bar 76. The handle latch shuttle 186 can slide or move independent of the fold latch shuttle 166 within the push bar 76. The latch 92 is connected to the handle latch shuttle 186 via the fastener 161 (FIG. 11) so that movement of one is tracked in the other. In this example, the fastener 161 includes a latch pin 188 (FIG. 11). In some cases, the handle latch shuttle 186 may also be coupled to a separate cable (not shown) for actuation. However, in the example shown, movement of the handle latch shuttle 186 is driven by a caregiver pulling upward on the tab 126. The handle latch shuttle 186 is biased downward to a latched position by a bias spring 190.

The handle latch shuttle 186 has a first axial slot 192 near an upper end 194 thereof to accommodate the bias pin for the fold latch. In this way, the handle latch shuttle 186 can move axially to release the handle latch assembly 84. The handle latch shuttle 186 has a second axial slot 196 near a lower end 198 thereof to accommodate the movement of the fold latch lifter 136 and the relative movement of a pivot pin 200 (FIG. 11) as the shuttle 186 moves upward. Also at the lower end 198 is a guide 202 in which the handle latch lifter 136 is captured. The guide 202 may, but need not, be configured in a manner similar to the guide 182 of the fold latch shuttle 166. At the upper end 194 of the handle latch shuttle 186, a hole 204 in the handle latch shuttle 186 is designed to accept the latch pin 188 (FIG. 11) to couple the handle latch shuttle 186 and the latch 92.

FIG. 10 also depicts the manner in which the bias springs 180, 190 are fixed within the push bar 76 in this example. The push bar 76 has holes 206, 208 located above and below the slot 158. The holes 206, 208 are generally configured to receive stops 210, 212 (FIG. 11) of the handle latch and fold latch assemblies 84, 82, respectively. Each stop 210, 212 need not be pin- or bolt-shaped as shown. An upper end of the spring 190 for the handle latch shuttle 186 bears against the stop 210, while an upper end of the spring 180 for the fold latch shuttle 166 bears against the stop 212.

Figure 12:
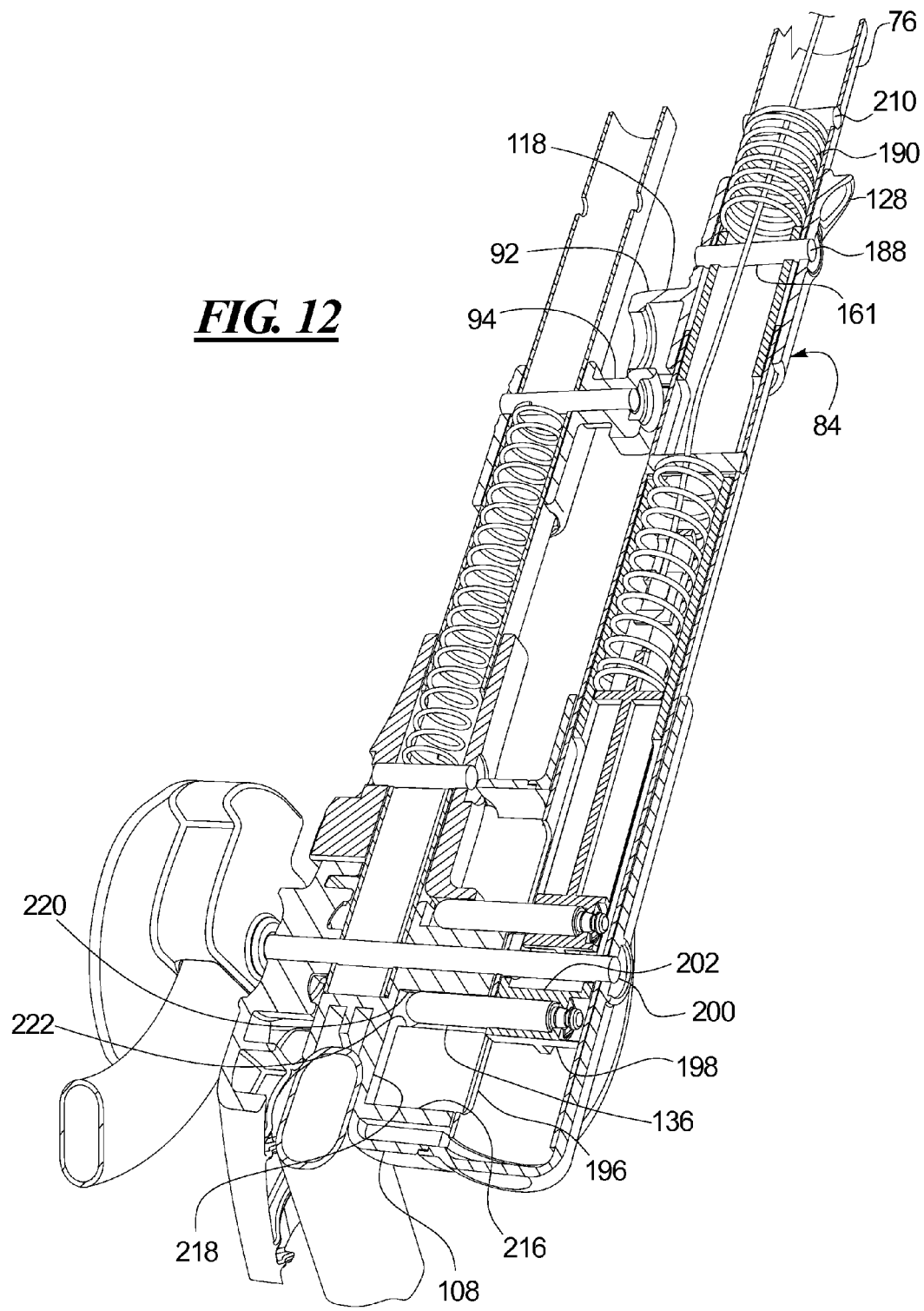
FIG. 12 shows a cutaway, perspective view of the pivot and latch assembly of FIG. 6 in which the handle latch is in a released state and the fold latch is in a latched state.

With reference now to FIGS. 11 and 12, cutaway views of the above-described pivot and latch assemblies are shown for the right side of the stroller 50 as viewed from the front perspective of FIG. 1. More specifically, the push bar 76, the latch carrier bar 86, and the pivot joint assembly 80 are shown in section to reveal the internal components of the fold latch assembly 82 and the handle latch assembly 84. The view of the components is from the front of the stroller 50 (FIG. 1) such that, working from right to left in FIG. 11, the push bar 76 and the cam cover 110 are positioned outward of the cam housing 108, which, in turn, is disposed laterally outward of the latch carrier bar 86 and the rear leg 56. Continuing laterally inward, the fold link 72 is followed by the side bar 64 and a connector or link plate 214 that couples the side bar 64 to the pivot joint assembly 80 via the pivot pin 200.

Figure 15:
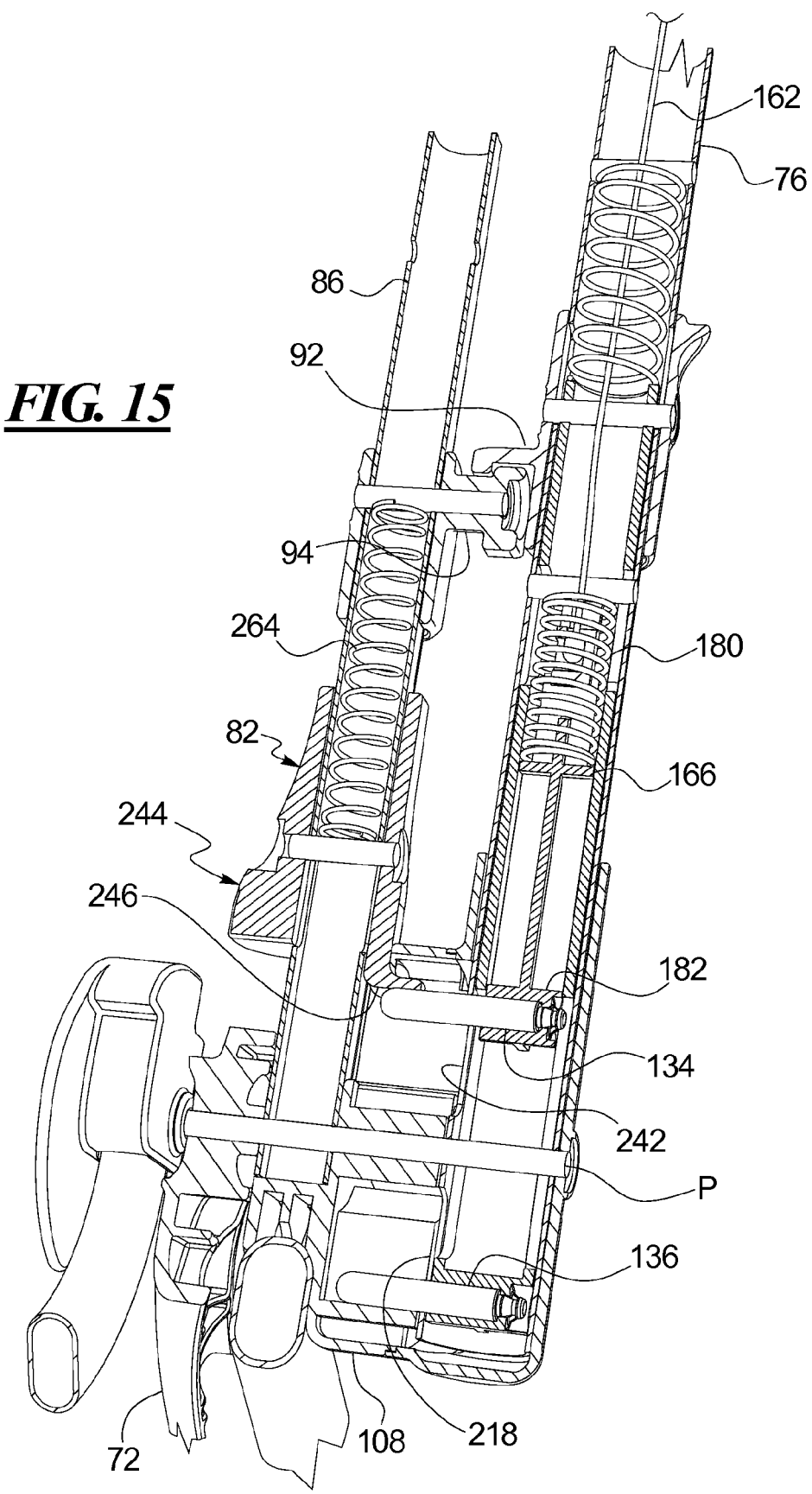
FIG. 15 shows a cutaway, perspective view of the pivot and latch assembly of FIG. 6 with the fold latch in the released state.

The cutaway views of FIGS. 11 and 12 also depict the telescopic, internal positioning of the fold latch shuttle 166 and the handle latch shuttle 186 within the push bar 76. The fold latch shuttle 166 is also telescopically disposed within the handle latch shuttle 186. The internal positioning of the shuttles 166, 186 and other components of the latch assemblies 82, 84 that guide and control the movement and positioning of the latches eliminates or reduces the potential for pinch points resulting from handle repositioning and frame folding. The operation of these latch guides is described further below in connection with the following figures: FIG. 11 shows both the fold latch assembly 82 and the handle latch assembly 84 in a latched state; FIG. 12 shows the handle latch assembly in a released state; and FIG. 15 shows the fold latch assembly 82 in a released state.

As shown in FIG. 11, with the latch 92 seated on the tab 94, the handle latch shuttle 186 is biased to a downward position in the latched state by the spring 190. In that position, the lower end 198 of the shuttle 186 is located at or near the lower end 160 of the push bar 76. The shuttle 186 extends upward until reaching the latch 92, with the upper end 194 of the shuttle 186 located above the clasp 118 of the latch 92, near the tab 126. In this state, the guide 202 of the shuttle 186 and the handle latch follower 136 are positioned at a lower end 216 of a slot 218 in the cam housing 108. The pivot pin 200 is generally disposed near the center of the slot 196 in the handle latch shuttle 186, immediately below where the lower end 184 of the fold latch shuttle 166 is located. The fold latch guide 182 and the fold latch lifter 134 are thus also disposed near the center of the slot 196, leaving room for the guide 182 and the lifter 134 to move upward in the slot 196 during a release operation described further below. The spring 180 is bearing downward on the shelf 178 of the fold latch shuttle 166 to maintain the latched state.

The configuration of the guides 182, 202 may vary from the example shown. Thus, the guides 182, 202 need not have a tubular or cylindrical shape configured to receive a pin-shaped finger, as shown. More generally, the guides 182, 202 may be configured in any way to capture a projection of the latch assemblies 82, 84. The shape and characteristics of the guides 182, 202 may therefore vary to cooperatively and securely engage the projection. Because the projection need not be pin-shaped, it follows that the shape of the guides 182, 202 may vary accordingly.

FIG. 12 depicts the handle latch assembly 84 in a released state. Whether due to an actuator (not shown) or a caregiver pulling upward on the tab 126, the latch 92 is moved upward and disengaged from the tab 94. In this example, the clasp 118 of the latch 92 is now spaced from and positioned above the tab 94 as shown. The handle push bar 76 is now free to move from the normal position to the reversed position. To guide and control that movement, the upward movement of the latch 92 pulls the handle latch shuttle 186 upward via the pin 188 (or fastener 161), compressing the spring 190 against the stop 210. That upward movement causes the guide 202 to move within the slot 196 in the push bar 76 to a position closer to the pivot pin 202 (i.e., the center of the earn housing 108). As a result, the handle latch follower 136 is pulled upward within the slot 218 in the cam housing 108. At this point, the handle latch follower 136 remains disposed within the slot 218 because the handle push bar 76 has yet to be moved toward the reversed position. In this example, the handle latch follower 136 is now positioned at an upper end 220 of the slot 218, at which a cam latch guide 222 begins. The cam latch guide 222 defines a track or path along which the handle latch follower 136 rides to allow the push bar 76 to be moved toward the reversed position via rotation about the pivot pin 200. In this way, the cam housing 108, the guide 202, the handle latch follower 136, and the cam latch guide 222 coordinate to prevent the handle latch assembly 84 from moving downward during the handle movement. By delaying such movement until the handle push bar 76 is in the reversed position above the latch tab 96 (FIG. 6), pinch points involved the latch 92 are avoided.

Further details regarding the controlled movement of the handle push bar 76 are provided in connection with the exemplary cam housing 108 shown in FIGS. 13A and 13B. The cam housing 108 is mated with and covered by the cam cover 110 (FIG. 6) on each push bar 76. The cam cover 110, the guide 202, and other components of the pivot and latch assemblies are not shown to better illustrate the cam-based guides and slots of the cam housing 108. In this example, the cam housing 108 is cylindrically shaped about the pivot axis P with an exterior rim 224 defining a perimeter 226 of an internal framework 228, which, in turn, defines two tracks, one for the fold latch lifter 134 and the other for the handle latch follower 136. The internal framework 228 has a number of radial fins 230 and a number of concentric ribs 232 to provide rigidity and support the tracks. In this example, several of the fins 230 and the ribs 232 define the tracks as shown and described below.

The track for the handle latch follower 136 in this example includes the slot 218, a slot 234, and the cam latch guide 222, which continuously connects the slots 218 and 234. The track defines an inverted, somewhat U-shaped path below the pivot axis P. The slot 218 extends radially downward and forward from the pivot axis P, and corresponds with the normal handle position. The slot 234 extends radially downward and rearward from the pivot axis P, and corresponds with the reversed handle position. The latch cam guide 222 in this example is a slot 236 that runs adjacent the rib 232 that defines the pivot axis P, terminating at the inner ends of the two slots 218, 234. More specifically, the slot 236 is generally arc-shaped and defined by an arc-shaped inner wall 238 and an arc-shaped outer wall 240. As described below, the cam slot 236 and the slots 218, 234 define stops for the handle movement that are safely enclosed within the cam housing 108. The slots 218, 234 may accordingly be referred to as "position slots," as in "the normal position slot 218" or "the reversed position slot 234."

When the handle is latched in the normal position, the handle latch follower 134 is seated within the slot 218, resting against the closed lower end 218 thereof. To release the handle latch assembly 84, the handle latch follower 134 is raised along the normal position slot 218 to the cam slot 236 between the two position slots 218, 234. Once the handle latch follower 134 clears the corner where the slot 218 meets the outer wall 240 of the cam slot 236, the handle can be pivoted from the normal position to the reverse position or vice versa. The spring 190 (FIG. 11) will automatically fire the handle latch follower 134 to the closed end of the reverse position slot 234 (as shown in phantom), and the handle is secured in the latched position in engagement with the reverse tab 96 as shown in FIG. 4. To move the handle back to the normal position, the user need only actuate the handle actuator (or otherwise move the latch 92 upward) and pull the handle rearward. During that movement, the handle latch follower 134 slides upward within the position slot 234, enters and slides within the cam slot 236, and then fires into the normal position slot 218 once the handle reaches the normal position.

Although the cam slot 236 is referenced above as a latch guide, the entire track defined by the cam housing 108 may alternatively or additionally be considered a latch guide. In either case, the operation of the handle latch assembly 84 is controlled and guided by the action inside the cam housing 108. This control is especially important between the two handle positions, as the configuration of the latch guide ensures that the handle latch 92 remains in a released position during the movement of the handle. In this way, the handle latch 92 does not create a pinch point as the handle moves toward one of the tabs 94, 96.

FIG. 13A also depicts the manner in which the cam housing 108 guides the movement of the fold latch lifter 134. The cam housing 108 has an elongated fold latch pass though 242 above the pivot axis P. A fold latch 244 has a projection 246 that is captured within, but which can slide along, the pass through 242. The fold latch lifter 134 is positioned under and adjacent the fold latch projections 246 with the handle in the normal position. The above-described framework of the cam housing 108 defines a lifter slot 248 at a base 250 of the latch pass through 242 upon which a lip 251 of the projection 246 rests in the latched state. With the handle rotated to the reverse position, the latch lifter 134 is positioned at a closed end 252 of the slot 248 as shown in phantom. As a result, the latch lifter 134 is not positioned under the latch projection 246. Thus, the latch lifter 134 can not contact or raise the fold latch 244 in the reverse handle position.

FIG. 13B depicts the position of the fold latch 244 in a released state. As described further below, the fold latch lifter 134 is driven upward from the slot 248 via actuation of the fold latch assembly 82. The fold latch 244 is, in turn, lifted by the latch lifter 134 to a position in which the lip 251 of the projection 246 is spaced from and disposed above the base 250 of the pass through 242. This movement of the fold latch 244 separates the fold latch 244 from the fold link 72, thereby allowing the relative movement of the frame as the stroller folds.

Figure 14A:
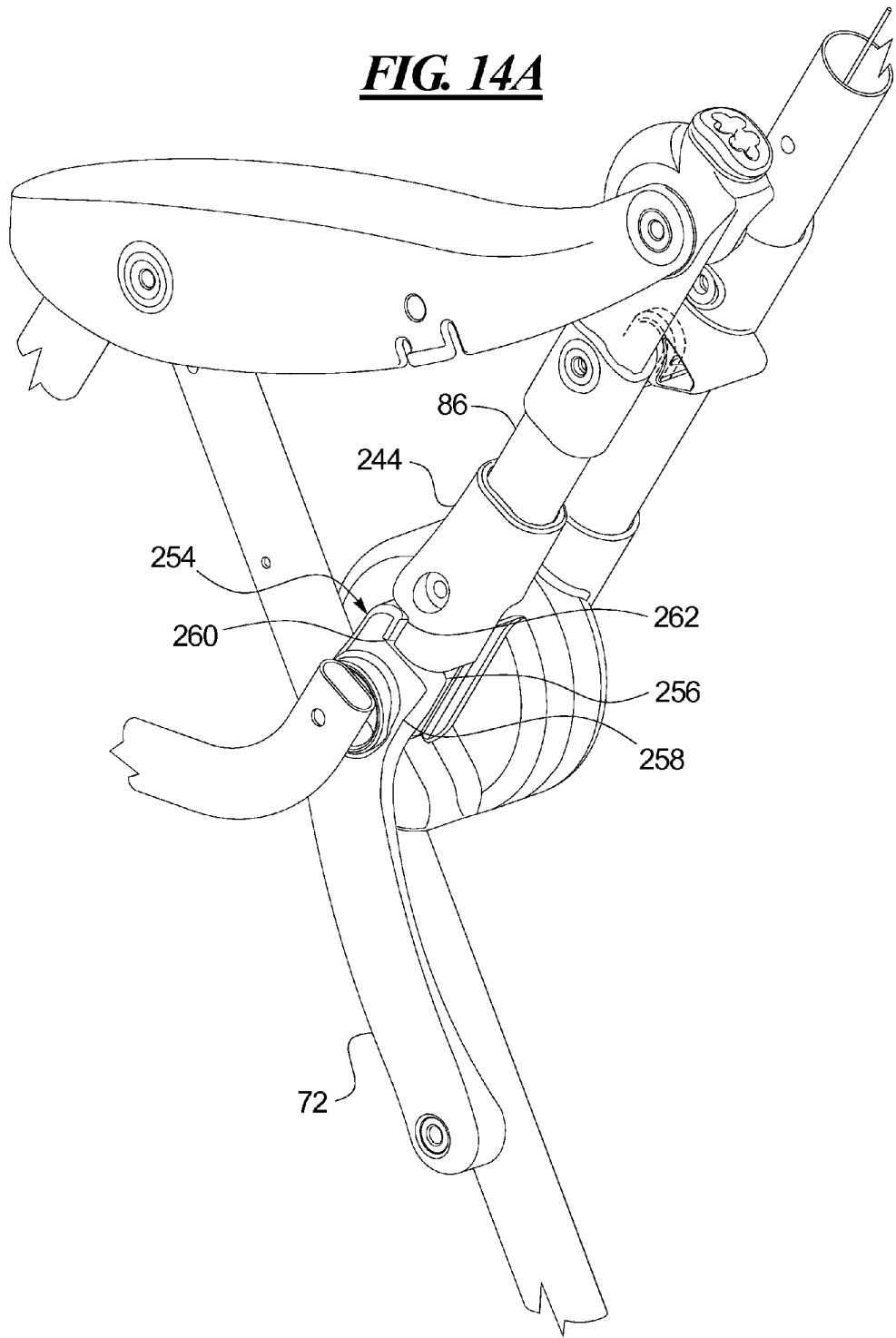
FIGS. 14A and 14B show detailed, perspective views of the pivot and latch assembly of FIG. 6 with the fold latch in the latched and released states, respectively.
Figure 14B:
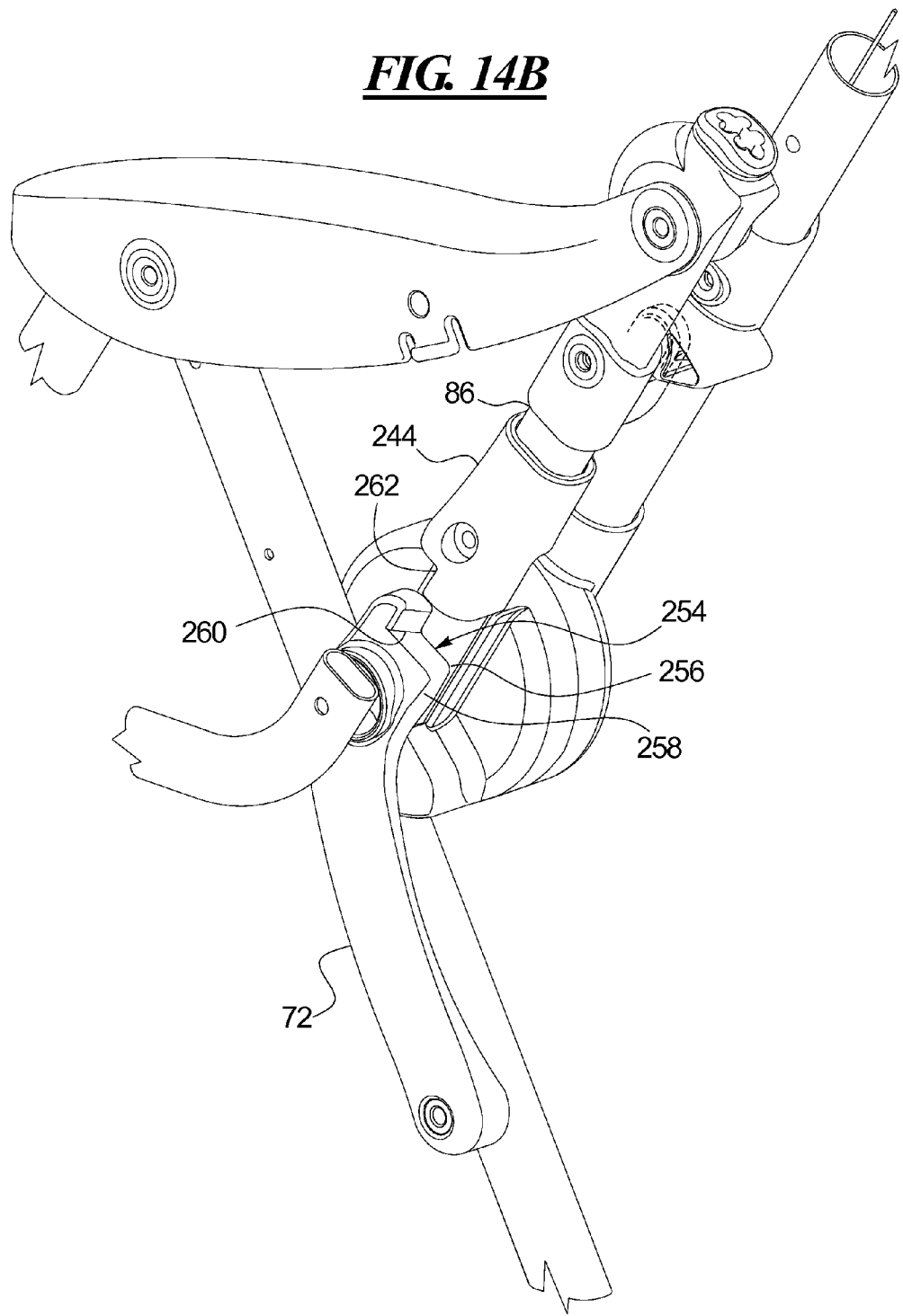

The positioning and separation of the fold latch 244 and the fold link 72 in the latched and released states is shown more clearly in FIGS. 14A and 14B. A fold latch receiver 254 is provided on a top end 256 of an upper section 258 of each fold link 72. The fold latch 244 is slidably carried on a lower end of each latch carrier bar 86. As shown in FIG. 14A, the fold latch 244 engages the fold latch receiver 254 when the fold latch assembly 82 resides in the latched state. In this example, the fold latch receiver 254 is configured as a notch 260 in the top end 256 of the fold link 72. A corresponding notch 262 in the fold latch 244 is configured to cooperatively engage the notch 260 in the latched state.

Figure 16:
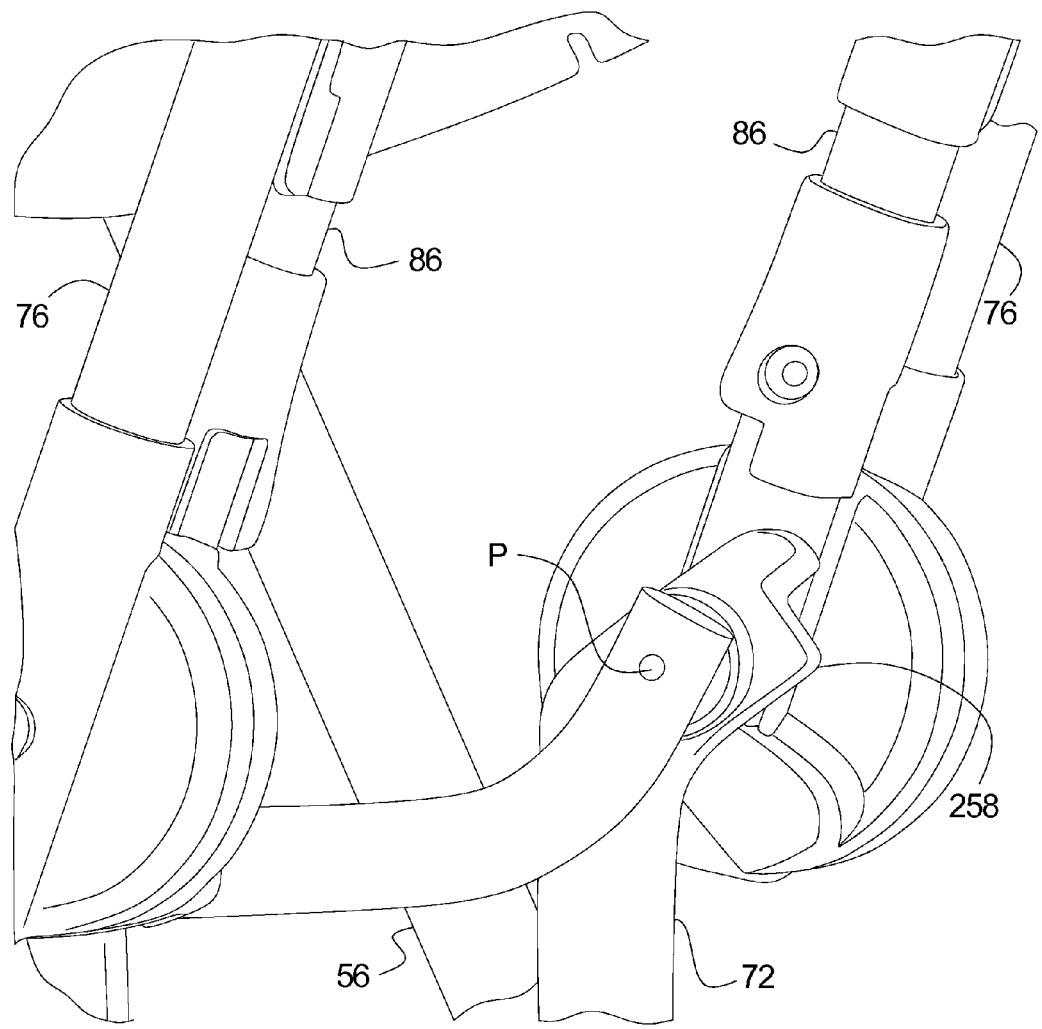
FIG. 16 shows a detailed, perspective view of the pivot and latch assembly of FIG. 6 after the fold latch has been released and as the frame moves from the in-use configuration toward the folded configuration.
Figure 17:
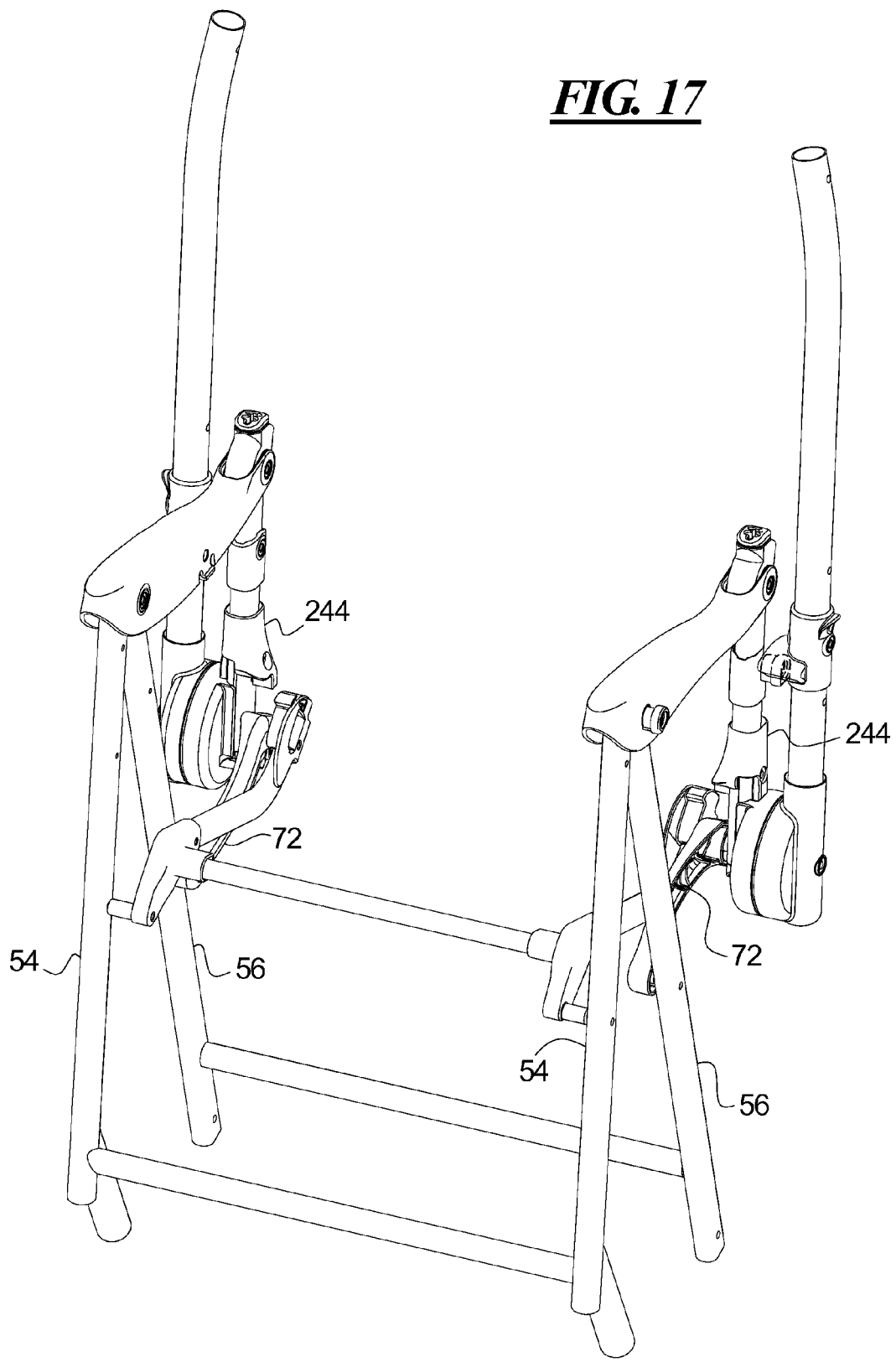
FIG. 17 shows a perspective, front view of the stroller of FIG. 1 in the folded configuration.
Figure 18:
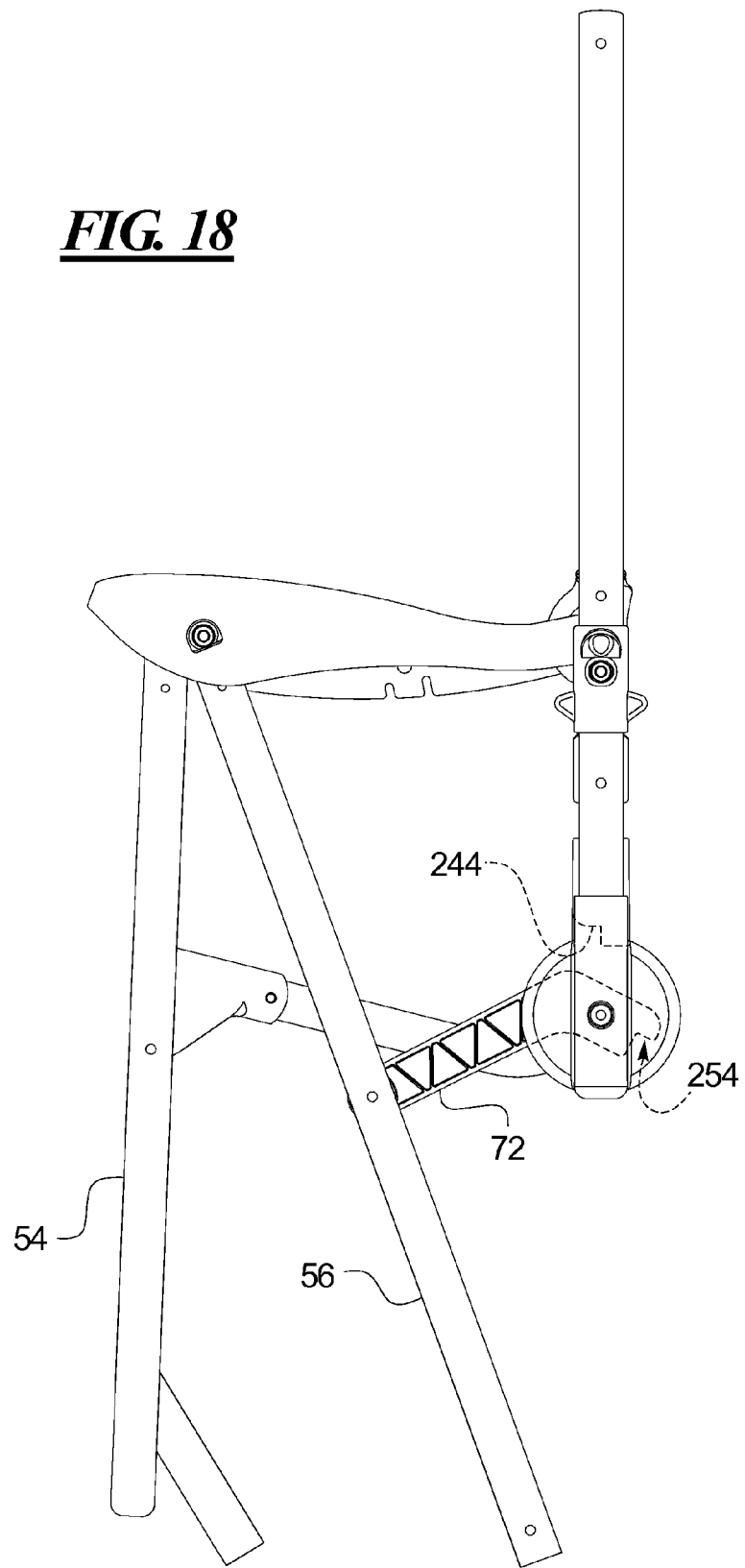
FIG. 18 shows an elevational, side view of the stroller of FIG. 1 in the folded configuration.

The operation of the fold latch assembly 82 is shown in greater detail in the cutaway view of FIG. 15. To fold the stroller frame, the handle in this example needs to be in the normal position (see e.g., FIG. 1) as described above. The actuator 100 (FIG. 1) is actuated to pull on the cable 162, which, in turn, pulls upward against the return force of the spring 180 on the fold latch lifter 134 via the latch guide 182 of fold latch shuttle 166. Each fold latch lifter 134 is pulled upward to an unlatched position in which the latch projection 246 is raised to the top of the pass through 242 as shown. As a result, each fold latch 244 is pushed upward along the latch carrier bar 86. Once the fold latches 244 are raised and out of engagement with, or clear of, the fold latch notches 260 (FIG. 14B), the handle push bars 76 are free to be rotated forward about the pivot axis P. However, because the handle latches 92 are still engaged with the normal position tabs 94 and the handle latch followers 136 are still captured in the normal position slots 218 of the cam housing 108, pushing the handle push bars 76 forward also pushes the latch carrier bar 86 forward. This movement in turn causes the fold links 72 to drop as depicted in FIG. 16, which shows the push bars 76 and the latch carrier bars 86 rotating about the pivot axis P as the frame moves from the in-use configuration to the folded configuration. More specifically, the upper section 258 of each fold link 72 rotates downward as the other end of the fold link 72 follows the rear leg 56 forward toward the front legs, as shown in FIGS. 17 and 18, which show the stroller in the folded orientation.

As also shown in FIG. 15, a spring 264 within each latch carrier bar 86 biases the fold latches 244 downward to a latched position in which the latches engage the fold latch notches 260 (FIG. 14B) on the fold links 72. With the fold latches 244 engaged, the stroller frame is held in a fixed position to retain the stroller in the in-use configuration. The spring 264 bears against a stop 266 to return the fold latch 244 downward from the released position (FIG. 15) to the latched position (FIGS. 11 and 12). In this example, the stop 266 is a mounting pin used to secure the tab 94 to the latch carrier bar 86. As shown in FIGS. 17 and 18, each fold latch 244 remains in the released position while the stroller is folded. FIG. 18 also shows the downward and rearward position of the fold latch receiver 254 on the fold link 72.

The disclosed stroller frame, handle, and latch assemblies provide a number of benefits over prior known strollers of this type. For one, the cam housing and the cam cover hide and cover both the handle latch follower and the fold latch lifter. Thus, these potential pinch points are covered and not exposed. In prior art strollers, the various fold latch and handle latch mechanisms would be quite different from the disclosed examples, and would be exposed.

As described in the examples above, the handle latches move with the handle latch shuttles, and thus the latch followers. The latch followers are maintained in the raised position between the two handle positions by the cam slot while the handle is being repositioned. The followers do not fire into the position slots until reaching the selected handle position. There is no contact between the tabs and the handle latches until the handle is in position. This eliminates another potential high load pinch point. The only load is that applied by the return springs as they fire the handle latches downward onto the tabs. In prior art strollers, the handle latches typically return to a latched condition immediately upon releasing from one handle position. The latches will thus contact a tab at the new position. A pinch or shear force would potentially be much greater in such a prior art arrangement because the user is applying the load by pulling or pushing the handle, and doing so at a substantial distance from the handle pivot and latch locations.

Further, the disclosed cam housing, the curved cam slot, and the two handle position slots create hard stops for the handle. These hard stops are hidden within the cam housing and cover. The handle latch followers will fire into the selected position slot upon reaching the slot and will act as the hard stop positioner for the handle when fired into the slot. In prior art strollers, the handles typically included an exposed hard stop for each handle position. The exposed hard stops are eliminated in the disclosed design.

In the examples described above, the stroller handle pivots about its lower end when being moved between the in-use position and the reverse position. The latches are positioned upward and spaced from the handle pivot. Hard stops are eliminated from the latch positions and latches as described above. Instead, the hard stops are provided within the hub at the handle pivot. In some cases, the stops are formed as pins and slots into which the pins, projecting from the bottom of the stroller handle, extend during use. The fold latch for folding the stroller frame is likewise incorporated into the handle hubs and the handle push arms near the handle position latches. The pivot assembly is substantially covered and hidden with the cam housing, which reduces potential pinch points of the various joints, as described above.

The stroller frame configuration may vary from that shown and described. For instance, the configuration and construction of the various components of the fold latch assembly, the handle latch assembly, the pivot assembly, and the like may vary from the examples shown and yet function as intended. While components of the handle latch assembly and the fold latch assembly are housed within common components in the examples described above, the pivot assembly may combine the handle and fold latches into a single mechanism.

As noted above, alternate examples of the reversible handle disclosed and described herein are possible. One or more aspects, features, or components of the following alternative examples may be incorporated into the above-described examples. Thus, a number of different combinations may be constructed in addition to those shown and described.

Figure 19:
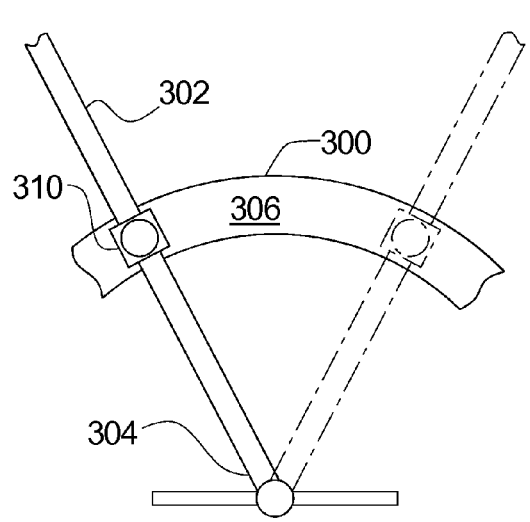
FIG. 19 shows a schematic, side view of an alternative pivot and latch assembly for an adjustable stroller handle in which an armrest link acts as a latch guide for movement between a normal position and a reversed position (phantom) in accordance with one or more aspects of the disclosure.
Figure 20:
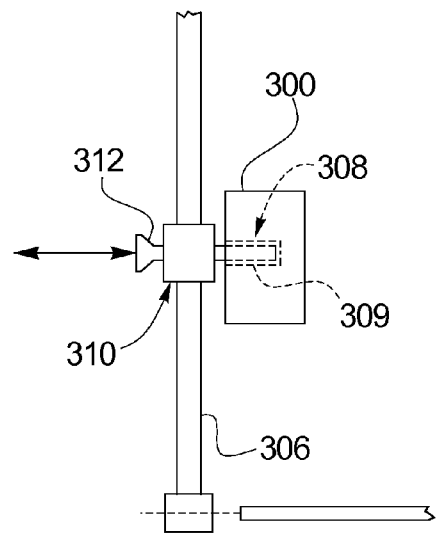
FIG. 20 shows a schematic, front view of the pivot and latch assembly of FIG. 19.

In one example, FIGS. 19 and 20 illustrate schematic views of a stroller armrest (or armrest link) 300, a reversible handle 302, and a handle latch arrangement. In this example, the stroller handle pivots about a bottom end 304. The armrest link 300 has a laterally outward facing surface 306 with two spaced apart latch receivers 308 (FIG. 20), each having a receptacle 309 (FIG. 20), which define the normal use and reverse home positions for the reversible handle 302. As shown in FIG. 20, a latch 310 may include a pin 312 spring-biased and movable in a horizontal direction into and out of a selected one of the receptacles 309. The pin 312 may be manually retracted or by using a variety of other methods and mechanisms. The pin 312 may be retracted in an outward direction permitting the stroller handle 302 to be moved between the normal use position and the reverse position. Upon reaching the desired position, the pin 312 fires into the appropriate receptacle 309 (or receiver 308). The latch 310 in this example may be configured to closely ride against the outer facing surface 306 of the armrest link 300 to eliminate or minimize pinching and shear or crush areas. In this way, the armrest link 300 acts as a latch guide alternative to the above-described examples that provides the same advantages.

Figure 21:
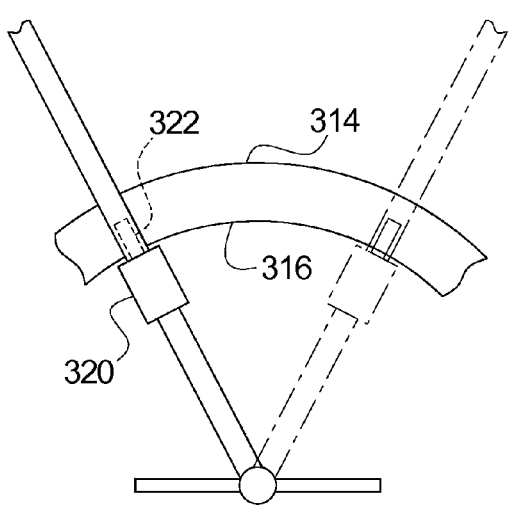
FIG. 21 shows a schematic, side view of another alternative pivot and latch assembly for an adjustable stroller handle in which an armrest link acts as a latch guide for movement between a normal position and a reversed position (phantom) in accordance with one or more aspects of the disclosure.
Figure 22:
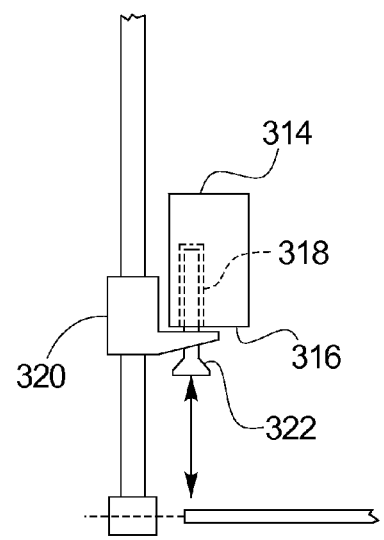
FIG. 22 shows a schematic, front view of the pivot and latch assembly of FIG. 21.

FIGS. 21 and 22 illustrate a reversible handle embodiment similar to that depicted in FIGS. 17 and 18. In this example, the stroller has a curved armrest (or armrest link) 314 with a bottom surface 316 that provides the handle latch and latch guide functions. As shown in FIG. 22, the bottom surface 316 of the armrest 314 includes two spaced apart latch receivers or receptacles 318, one for each of the normal use and reverse home positions. A handle latch 320 includes a vertically oriented or upward projecting latch pin 322 that can extend into and be retracted from the receptacles 318. In either of the embodiments shown in FIGS. 19-22, the latch pin may be mechanically actuated for retracting the pin, or the pins may be automatically retracted utilizing a remote actuator (not shown) of some type. Alternatively, the latch mechanisms including the pins may be completely manually operated both for retraction and reinsertion at each of the positions. Similarly, in either embodiment, the home position stops may be provided in a variety of ways as described herein. Alternatively, the home position stops may be eliminated with only the latch pins utilized for retaining the handle in the desired or selected position during use.

Figure 23:
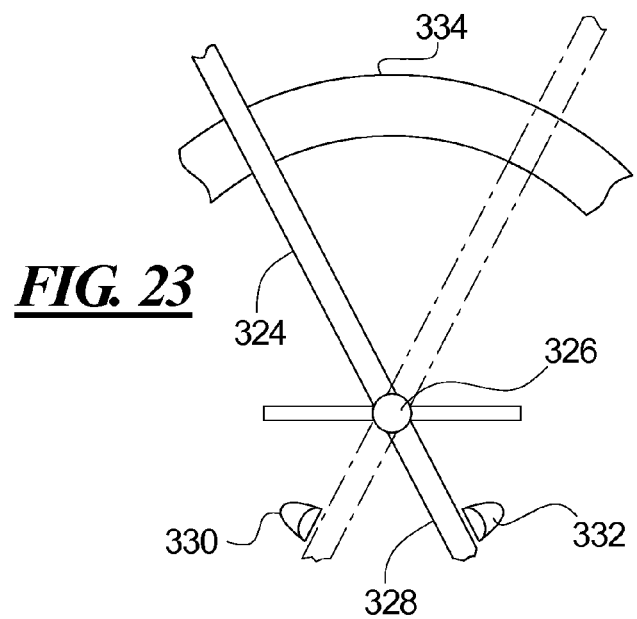
FIG. 23 shows a schematic, side view of another example of a reversible handle arrangement in which hard positional stops are positioned below a pivot point to establish the normal and reversed (phantom) positions for the handle in accordance with one or more aspects of the disclosure.

FIG. 23 is a schematic representation of a stroller handle 324 with a handle pivot 326 spaced upward from a bottom end 328 of the stroller handle 324. In such an example, hard stops 330, 332 may be placed below the handle pivot 326 and well out of reach of the user and the child seat occupant. Thus, the hard stops 330, 332 are provided for the handle 324 in each of the in use or reverse handle positions, but the stops 330, 332 are remote from access. The remote positioning helps to avoid a shear or crushing point where the finger of a user or seat occupant can be caught when the stroller handle position is being altered. Significant load can often be applied at these stops between the push bars and the stops, insofar as the leverage applied by the user is typically from the top end of the handle spaced far from the hard stop positions. In this example, handle latches (not shown) may be configured as previously described or in other ways and placed elsewhere on the handle 324, whether at or on an armrest 334, above the armrest 334, below the armrest 334, at the handle pivot 326, below the handle pivot 326, or even at the bottom end 328 of the handle 324 where the hard stops 330, 332 are provided.

Figure 24:
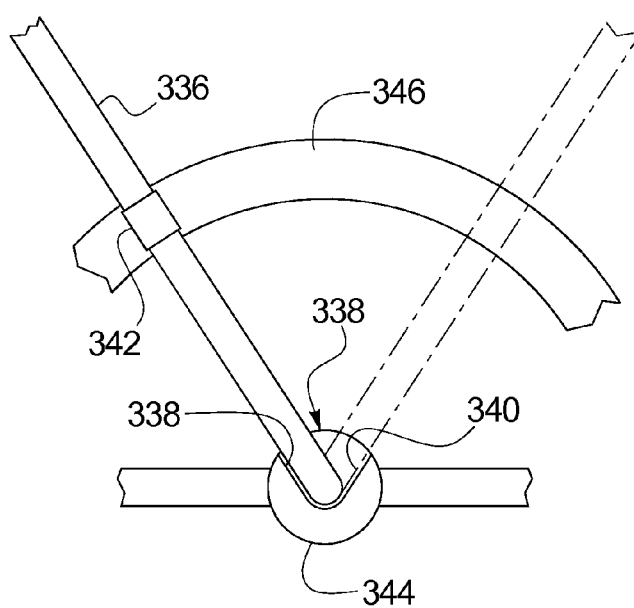
FIG. 24 shows a schematic, side view of another example of a reversible handle arrangement having hard positional stops to establish the normal and reversed (phantom) positions for the handle provided by a pivot hub constructed in accordance with one or more aspects of the disclosure.

FIG. 24 shows another example of a stroller handle 336 with forward and reverse hard stops 338, 340 that are positioned away from the positioning of one or more handle latches 342. In this example, a simple pivot hub 344 at the bottom end of the handle 336 includes a V-shaped receptacle 338 that defines the forward stop 338 and the reverse stop 340, one for each of the handle positions. In some cases, the V-shaped hub 338 is exposed, and yet the hard stops 338, 340 are positioned low enough that it would be difficult for a user or a child seat occupant to get a finger caught between the handle 336 and the stop 338, 340. In another example, the hub 344 is mostly enclosed. For example, a rotating device or cover may close off any openings during use, thus eliminating the potential for a user or child seat occupant to have a finger caught in the handle 336 and crushed between the handle 336 and the stop 338, 340. In this example, the latch devices 342 for the stroller handle 226 at each of the handle positions may be provided or spaced upward from the handle pivot as schematically represented in FIG. 24. Alternatively, the latches 342 may be provided at or in the hub 344, or at some location in between the hub 344 and a seat armrest 346 or the like.

Figure 25:
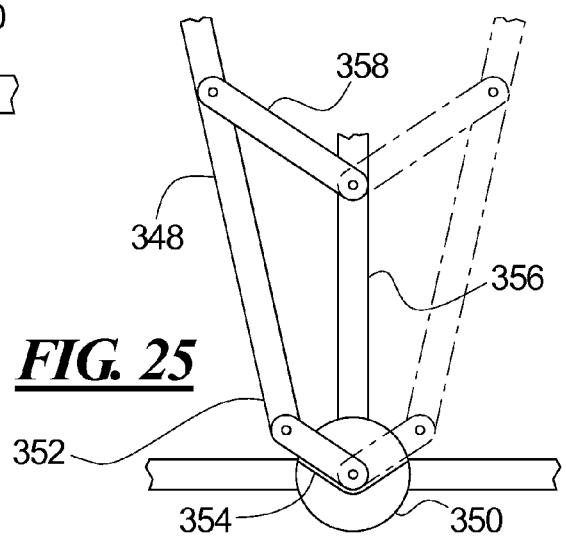
FIG. 25 shows a schematic, side view of another example of a reversible handle arrangement with the pivot hub of FIG. 25 and a hinged handle to establish the normal and reversed (phantom) positions for the handle in accordance with one or more aspects of the disclosure.

In another example shown in FIG. 25, a reversible handle 348 utilizes hard stops at a hub 350 in similar fashion to the embodiment depicted in FIG. 24, but with an alternate handle construction for providing the handle reversibility. In this example, a four-bar linkage arrangement is utilized to provide the stroller handle 348 with stability and strength during use and yet permit reversibility of the handle 348. As shown, the handle 348 includes a lower end 352 pivotally coupled to one end of a bottom link 354. The other end of the bottom link 354 is pivotally coupled to a vertical frame element 356 of the stroller. An upper link 358 is pivotally connected at or near another end of the stroller handle 348. This connection may be spaced up from the bottom end of the handle 348. The other end of the upper link 358 is pivotally coupled to the vertical frame element 356 above the pivotal connection with the lower link 354.

The upper link 358, the stroller frame element 356, the lower link 354, and the portion of the stroller handle 348 between the two link connections define a four-bar linkage. In such an example, the hub 350 provided at the bottom of the stroller frame part 356 can again be configured to define hard stops for either the bottom end of the stroller handle 348, or alternatively, the bottom link 354 as schematically represented in FIG. 25. The four-bar linkage arrangement can be configured to permit the handle 348 to move from the normal use position to the reverse handle position depicted in phantom in FIG. 25. The linkage arrangement can also be configured to eliminate or inhibit any pinch or shear points between the various links of the arrangement. A handle latch (not shown) may be provided on the upper pivot point between each vertical frame part 356 and the upper link 358, as desired. Alternatively, the handle latches may be provided on the stroller handle 348 and an armrest link (not shown) or other elements of the frame. Such a latch may interact with the stroller handle 348 near or at the pivot point between the upper link 358 and the handle 348. In an alternative example, the stroller handle latches may be provided at or near the hub 350, which may be located at the pivotal connection of the lower link 354 to the vertical stroller frame part 356. In these ways, the example of FIG. 25 illustrates a number of features and components substantially different in form and function from the embodiments described above.

FIG. 26 depicts another reversible handle arrangement that differs in several aspects from the examples described above. The arrangement includes a fixed position normal use handle 360 that can either be a permanent part of the stroller frame or a removable part of the stroller frame. A reverse position handle 362 is telescopically mounted within or to rear legs 364 of the stroller frame and, in one example, can be slidably retracted into and extended from the rear legs 364. In another alternative example, the reverse handle 362 is removable and detachable from the stroller when not used. More generally, these arrangements provide the effect of a reversible handle without having to provide a mechanism or latch system to permit reversing the position of a single handle, as in the above-described embodiments. Nonetheless, and as set forth above, one or more aspects of these arrangements may be incorporated into the above-described embodiments, including, for instance, detachability or telescopic storage.

FIGS. 27 and 28 illustrate yet another example of a reversible handle 366. To help eliminate or reduce the possibility of pinching or crushing a finger, a latch mechanism 368 on the reversible handle 366 is similar to those examples described above, insofar as it remains in the elevated, released position during movement of the handle 366. As the handle 366 is pivoted from the normal use position to the reverse position, or vise versa, the latch 368 is maintained in the released position until reaching the selected handle position. This feature can be accomplished in a variety of alternative ways in comparison to the above-described examples. The latch mechanism 368 may be spaced upward or away from a seat or other mating component 370 of the mechanism when released in order to provide sufficient clearance for the finger of a user or seat occupant. In one example, a clearance of twelve (12) millimeters or greater may be provided between the mating latching components as represented in FIG. 28 so that a finger of a user or seat occupant would not be pinched or crushed as the handle 366 is moved into position. The latch 368 may then be designed to drop into position either automatically, mechanically, or manually upon reaching the home position.

Figure 29:
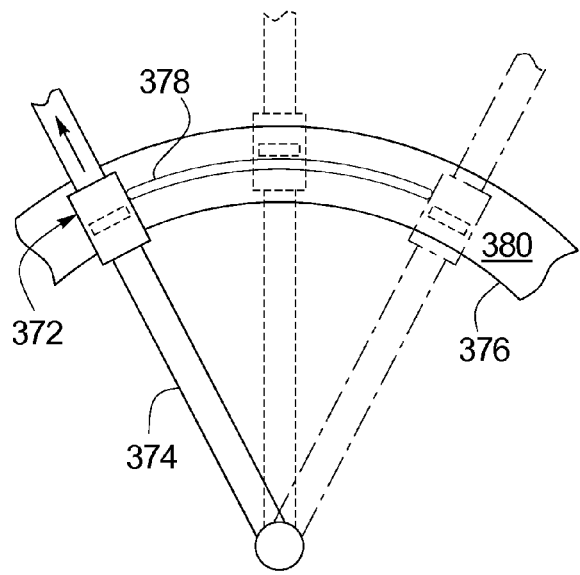
FIG. 29 shows a schematic, side view of another exemplary reversible handle arrangement in which an armrest link acts as a latch guide for movement between a normal position, an intermediate position (phantom), and a reversed position (phantom) in accordance with one or more aspects of the disclosure.
Figure 30:
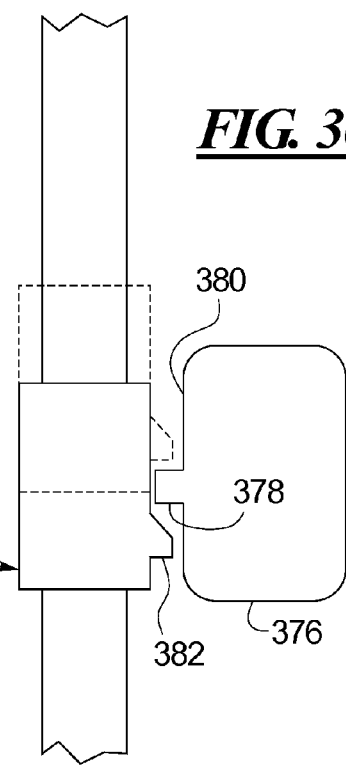
FIG. 30 shows a schematic, front view of the reversible handle arrangement of FIG. 30 to depict the latch guide in a latched position and in an unlatched position (phantom)

FIGS. 29 and 30 illustrate one example of a latch 372 similar to that in FIG. 27, and including a mechanism for retaining the latch 372 in the elevated or released position as a handle 374 is being moved. In this example, an armrest 376 has an elongated rib 378 disposed on an exterior facing side 380 and curved to follow the path of travel of the reversible handle 374. As shown in FIG. 29, the latch mechanism 372 can clear the rib 378 at either end thereof and therefore drop down to a latched position or be elevated (or raised to the released position, as shown in phantom). As the handle 374 is moved from one position to the other, a mating rib or projection 382 on the latch mechanism 372 rides along a top of the rib 378 of the armrest link 376 maintaining the latch 372 in the elevated position. The rib 378 on the armrest 376 terminates appropriately at each of the normal use and reverse use handle position locations on the armrest 376 so that the latch 372 can drop into the latched position upon reaching each of these home positions. In an alternative embodiment, the armrest 376 may include a groove or otherwise suitable track and the latch may include a mating element such as a projection that rides in the groove as the handle is moved between the two handle positions.

Figure 31:
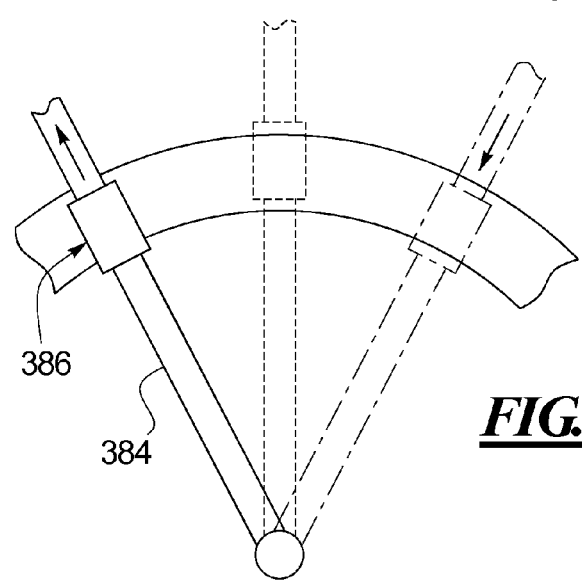
FIG. 31 shows a schematic side view of another example of a reversible handle arrangement in which an armrest link acts as a latch guide for movement between a normal position, an intermediate position (phantom), and a reversed position (phantom) in accordance with one or more aspects of the disclosure.

FIG. 31 illustrates another alternative embodiment depicting a reversible handle 384 in which a latch 386 is maintained in the release position as the handle 384 is moved from one position to the other. In this example, the latch mechanism 386 may be configured to be mechanically cocked or held in the released position once manually pulled or automatically moved to the released position. The latch 386 maintains the released position as the handle 384 is pivoted between the normal use and the reverse positions. The latch 386 can be manually dropped back into the latched position by a user upon reaching the selected position of the handle 384. A spring ball, i.e., Valco ball, arrangement may be used to hold the latch 386 in the released or cocked position during movement of the handle 384. Alternatively, a mechanism or device can be employed either on an armrest, the latch 386, a combination of the two, or elsewhere on the handle 384, such as on a pivot hub, that automatically moves the latch 386 to the released position and/or to the latched position as well as to hold the latch 386 in the release position during movement of the handle 384.

In another alternative embodiment, not shown, a reversible handle includes a pivot hub in which all of the mechanisms and devices, including the latches and stops, are retained and housed within the pivot hub. In such an example, the pinch and/or shear points may thus be enclosed and hidden within a hub cover to prevent or inhibit one's finger from being caught or pinched during use or movement of the handle.

Although certain strollers have been described herein in accordance with the teachings of the present disclosure, the scope of coverage of this disclosure is not limited thereto. On the contrary, all embodiments of the teachings of the disclosure that fairly fall within the scope of permissible equivalents are disclosed by implication herein.

What is claimed is:

1. A stroller comprising:
a frame;
a pivot joint assembly mounted on the frame and defining a pivot axis;
a handle coupled to the frame at the pivot joint assembly, the pivot assembly being configured for rotation of the handle about the pivot axis between first and second positions; and
a latch assembly including a latch external to the pivot joint assembly and a projection, the latch being movable between a latched state in which the latch assembly secures the handle in either the first position or the second position and a released state in which the handle is released for movement between the first and second positions; and
a latch guide that defines a path along which the projection rides during the movement between the first and second positions such that the latch remains in the released state during the movement between the first and second positions, wherein the latch is coupled to the latch guide via a handle latch follower that rides along the path of the latch guide.

2. The stroller of claim 1, wherein the pivot assembly includes a housing and wherein the projection is disposed within the housing.

3. The stroller of claim 1, wherein the latch guide includes a cam slot.

4. The stroller of claim 1, wherein the pivot assembly includes the latch guide.

5. The stroller of claim 1, wherein the pivot joint assembly includes a hub and wherein the projection and the latch guide are enclosed within the hub.

6. The stroller of claim 5, wherein the latch assembly includes first and second stops enclosed within the hub to define the first and second positions, respectively.

7. The stroller of claim 1, further comprising a fold latch assembly carried by the frame and movable between a latched state in which the frame is secured in an in-use orientation and a released state for movement about the pivot axis toward a folded orientation of the frame.

8. The stroller of claim 7, wherein the fold latch assembly includes a finger, wherein the pivot joint assembly includes a hub, and wherein the finger and the projection are disposed within the hub.

9. A stroller comprising:
a frame;
a pivot joint assembly mounted on the frame and defining a pivot axis;
a handle coupled to the frame at the pivot joint assembly, the pivot assembly being configured for rotation of the handle about the pivot axis between first and second positions; and a latch assembly including a projection and movable between a latched state in which the latch assembly secures the handle in either the first position or the second position and a released state in which the handle is released for movement between the first and second positions; and a latch guide that defines a path along which the projection rides during the movement between the first and second positions such that the projection remains in the released state during the movement between the first and second positions, wherein the frame includes an armrest link and wherein the latch assembly includes a latch clasp that runs along and against the armrest link during the movement.

10. A stroller comprising:

a frame;

a pivot joint assembly mounted on the frame and defining a pivot axis;

a handle coupled to the frame at the pivot joint assembly, the pivot assembly being configured for rotation of the handle about the pivot axis between first and second positions; and a latch assembly including a projection and movable between a latched state in which the latch assembly secures the handle in either the first position or the second position and a released state in which the handle is released for movement between the first and second positions; and a latch guide that defines a path along which the projection rides during the movement between the first and second positions such that the projection remains in the released state during the movement between the first and second positions, wherein the frame includes an armrest link and wherein the armrest link includes a surface that defines the latch guide.

11. A stroller comprising:

a frame;

a pivot joint assembly mounted on the frame and including a hub that defines a pivot axis;

a handle coupled to the frame at the pivot assembly, the pivot assembly being configured for rotation of the handle about the pivot axis between first and second positions; and a latch assembly movable between a latched state in which the latch assembly secures the handle in either the first position or the second position and a released state in which the handle is released for movement between the first and second positions, the latch assembly including a cam disposed at the hub and configured to control the rotation of the handle; and wherein the latch assembly includes first and second stops enclosed within the hub to define the first and second positions, respectively.

12. The stroller of claim 11, wherein the hub includes a housing in which the first and second stops are disposed.

13. The stroller of claim 11, further comprising a fold latch assembly carried by the frame and movable between a latched state in which the frame is secured in an in-use orientation and a released state for movement about the pivot axis toward a folded orientation of the frame.

14. The stroller of claim 13, wherein the fold latch assembly includes a finger disposed within the hub.

15. The stroller of claim 11, wherein the latch assembly includes a latch external to the pivot joint assembly.

16. The stroller of claim 15, wherein the latch is coupled to the cam via a handle latch follower, the cam defining a path in which the handle latch follower rides during the rotation, the path being configured such that the latch assembly remains in the released state between the first and second positions.

17. A stroller comprising:

a frame;

a pivot joint assembly mounted on the frame and including a hub that defines a pivot axis;

a handle coupled to the frame at the pivot assembly, the pivot assembly being configured for rotation of the handle about the pivot axis between first and second positions; and a latch assembly movable between a latched state in which the latch assembly secures the handle in either the first position or the second position and a released state in which the handle is released for movement between the first and second positions; and wherein the latch assembly includes first and second stops enclosed within the hub to define the first and second positions, respectively, wherein the hub includes a cam housing and a cam cover configured to meet the cam housing.

18. The stroller of claim 17, wherein the cam housing defines a cam slot, wherein the latch assembly includes a projection engaged in the cam slot such that the cam slot guides the projection during the movement between the first and second positions.

* * * * *